(12) United States Patent
Okumura

(10) Patent No.: US 11,557,233 B2
(45) Date of Patent: Jan. 17, 2023

(54) INFORMATION DISPLAY SYSTEM AND WEARABLE DEVICE

(71) Applicant: NEC Platforms, Ltd., Kawasaki (JP)

(72) Inventor: Fujio Okumura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/419,070

(22) PCT Filed: Feb. 19, 2020

(86) PCT No.: PCT/JP2020/006567
§ 371 (c)(1),
(2) Date: Jun. 28, 2021

(87) PCT Pub. No.: WO2020/189162
PCT Pub. Date: Sep. 24, 2020

(65) Prior Publication Data
US 2022/0068173 A1    Mar. 3, 2022

(30) Foreign Application Priority Data
Mar. 18, 2019  (JP) ............................. JP2019-049401

(51) Int. Cl.
*G09G 3/00* (2006.01)
*G06T 7/73* (2017.01)
(Continued)

(52) U.S. Cl.
CPC ......... *G09G 3/001* (2013.01); *G02B 27/0172* (2013.01); *G06F 3/013* (2013.01);
(Continued)

(58) Field of Classification Search
CPC ........... G09G 3/001; G09G 2320/0666; G09G 2320/0693; G09G 2340/0464;
(Continued)

(56) References Cited

U.S. PATENT DOCUMENTS 10,306,217 B2 * 5/2019 Sato ..................... H04N 13/239
2015/0192774 A1   7/2015 Watanabe et al.
(Continued)

FOREIGN PATENT DOCUMENTS

| JP | 2015048171 A | 3/2015 |
|---|---|---|
| JP | 2015141418 A | 8/2015 |

(Continued)

OTHER PUBLICATIONS

Tuceryan, M., Genc, Y., & Navab, N. (2002). Single-point active alignment method (SPAAM) for optical see-through HMD calibration for augmented reality. Presence: Teleoperators & Virtual Environments, 11(3), 259-276.*

(Continued)

*Primary Examiner* — Sarah Lhymn

(57) ABSTRACT

An information display system includes a frame, a pair of cameras arranged at both side ends of the frame, a transparent display fitted into the frame, a display position setting device that detects a target based on a feature extracted from image data captured by the pair of cameras, and sets, as a display position, a position at which a straight line connecting an eye of a user wearing the frame and the target passes through the transparent display, and a controller that controls the transparent display in such a way as to display a point light at the display position set by the display position setting device.

9 Claims, 32 Drawing Sheets

(51) Int. Cl.
*G02B 27/01* (2006.01)
*G06F 3/01* (2006.01)
*H04N 13/239* (2018.01)
*G09G 3/3208* (2016.01)

(52) U.S. Cl.
CPC ........ *G06T 7/73* (2017.01); *G02B 2027/0138* (2013.01); *G02B 2027/0178* (2013.01); *G06T 2207/10012* (2013.01); *G09G 3/3208* (2013.01); *G09G 2320/0666* (2013.01); *G09G 2320/0693* (2013.01); *G09G 2340/0464* (2013.01); *G09G 2370/16* (2013.01); *H04N 13/239* (2018.05)

(58) Field of Classification Search
CPC ............ G09G 2354/00; G02B 27/0172; G02B 2027/0138; G02B 2027/017; G06F 3/013; G06T 7/73; G06T 2207/10012; H04N 13/239
See application file for complete search history.

(56) References Cited

U.S. PATENT DOCUMENTS

| | | | |
|---|---|---|---|
| 2015/0213648 A1 | 7/2015 | Wu et al. | |
| 2015/0288944 A1* | 10/2015 | Nistico | G06F 3/017 345/156 |
| 2016/0080732 A1 | 3/2016 | Pedley et al. | |
| 2016/0133051 A1 | 5/2016 | Aonuma et al. | |
| 2017/0069135 A1 | 3/2017 | Komaki et al. | |
| 2018/0004289 A1* | 1/2018 | Wilson | G06V 10/143 |
| 2018/0032131 A1 | 2/2018 | Yasuda et al. | |
| 2019/0019341 A1* | 1/2019 | Li | G02B 27/0101 |
| 2019/0179409 A1* | 6/2019 | Jones | G06F 1/163 |

FOREIGN PATENT DOCUMENTS

| | | | | |
|---|---|---|---|---|
| JP | 2016134173 A | | 7/2016 | |
| JP | 2016188123 A | | 11/2016 | |
| JP | 2016224086 A | | 12/2016 | |
| JP | 2017048024 A | | 3/2017 | |
| JP | 2017215928 A | * | 12/2017 | ......... G02B 27/0093 |
| JP | 2018174003 A | | 11/2018 | |
| KR | 20180012713 A | * | 10/2017 | |
| WO | 2014002686 A1 | | 1/2014 | |
| WO | 2016139850 A1 | | 9/2016 | |
| WO | 2019130900 A1 | | 7/2019 | |

OTHER PUBLICATIONS

Shotton, J., Winn, J., Rother, C., & Criminisi, A. (May 2006). Textonboost: Joint appearance, shape and context modeling for multi-class object recognition and segmentation. In European conference on computer vision (pp. 1-15). Springer, Berlin, Heidelberg.*
International Search Report for PCT Application No. PCT/JP2020/006567, dated Apr. 21, 2020.
English translation of Written opinion for PCT Application No. PCT/JP2020/006567, dated Apr. 21, 2020.
Shogaki Yohei et al, "Calibration between Stereo-Camera and Display for 3D Image Presentation in VR Systems", Technical Report of IEICE_PRMU2003-280, Institute of Electronics, Information and Communication Engineers (IEICE), Mar. 18, 2004, pp. 145-148, vol. 103, No. 737.
Japanese Office Action for JP Application No. 2019-049401 dated Feb. 18, 2020 with English Translation.
Japanese Office Action for JP Application No. 2019-049401 dated Jun. 30, 2020 with English Translation.
Japanese Office Action for JP Application No. 2019-049401 dated Apr. 27, 2021 with English Translation.

* cited by examiner

Fig.12

| NUMBER | AIM | TRANSPARENT DISPLAY UNIT (LEFT) | | AIM | TRANSPARENT DISPLAY UNIT (RIGHT) | |
|---|---|---|---|---|---|---|
| | | LEFT IMAGE | RIGHT IMAGE | | LEFT IMAGE | RIGHT IMAGE |
| 1 | $(x_1, y_1)$ | $(X_{1LL}, Y_{1LL})$ | $(X_{1LR}, Y_{1LR})$ | $(x_1, y_1)$ | $(X_{1RL}, Y_{1RL})$ | $(X_{1RR}, Y_{1RR})$ |
| 2 | $(x_2, y_2)$ | $(X_{2LL}, Y_{2LL})$ | $(X_{2LR}, Y_{2LR})$ | $(x_2, y_2)$ | $(X_{2RL}, Y_{2RL})$ | $(X_{2RR}, Y_{2RR})$ |
| 3 | $(x_3, y_3)$ | $(X_{3LL}, Y_{3LL})$ | $(X_{3LR}, Y_{3LR})$ | $(x_3, y_3)$ | $(X_{3RL}, Y_{3RL})$ | $(X_{3RR}, Y_{3RR})$ |
| ⋮ | ⋮ | ⋮ | ⋮ | ⋮ | ⋮ | ⋮ |
| i | $(x_i, y_i)$ | $(X_{iLL}, Y_{iLL})$ | $(X_{iLR}, Y_{iLR})$ | $(x_i, y_i)$ | $(X_{iRL}, Y_{iRL})$ | $(X_{iRR}, Y_{iRR})$ |
| ⋮ | ⋮ | ⋮ | ⋮ | ⋮ | ⋮ | ⋮ |

170

INFORMATION DISPLAY SYSTEM AND WEARABLE DEVICE

This application is a National Stage Entry of PCT/JP2020/006567 filed on Feb. 19, 2020, which claims priority from Japanese Patent Application 2019-049401 filed on Mar. 18, 2019, the contents of all of which are incorporated herein by reference, in their entirety.

TECHNICAL FIELD

The present invention relates to an information display system and a wearable device.

BACKGROUND ART

Augmented reality (AR) glasses are a wearable device that displays an image conforming to the real world on a lens. A user wearing the AR glasses can recognize additional information regarding an outside view seen through the lens by referring to the image displayed on the lens.

PTL 1 discloses a display device including a head mounted type first display unit that displays an image so that an outside view can be visually recognized, and a first control unit that causes the first display unit to display an image of an indicator based on image data included in guidance information received from an external second display device. The device of PTL 1 is characterized in that the image of the indicator is displayed at a position specified by data indicating a position of the indicator detected by the second display device among data included in the guidance information received by the first display unit.

PTL 2 discloses an information processing device including a recognition unit that recognizes a position of a gaze target associated with a user operation, and a line-of-sight detection unit that detects a line-of-sight position of a user at the time of the user operation. Further, the device of PTL 2 includes a line-of-sight detection adjustment unit that adjusts line-of-sight detection by the line-of-sight detection unit based on the recognized position of the gaze target and the line-of-sight position, and an application processing unit that executes predetermined application processing in accordance with a user operation on the gaze target. The device of PTL 2 is characterized in that the line-of-sight detection is adjusted based on the relationship between the line-of-sight position at the time of user operation for executing application processing and a display position of the gaze target.

PTL 3 discloses a glasses-type wearable terminal that can be worn by a worker who picks an article in a warehouse. The terminal of PTL 3 includes a display unit arranged in an eye frame portion, a camera unit that captures an image of a unique pattern attached to an article, and a sensor unit that detects a position of the terminal in the warehouse and a direction in which the eye frame portion faces. The terminal of PTL 3 displays, on a display unit, information regarding an article that can be present ahead of the line of sight of the worker, and performs image recognition of a unique pattern captured by the camera unit. Then, the terminal of PTL 3 compares the unique pattern subjected to the image recognition with the information regarding the article displayed on the display unit, thereby performing actual confirmation of the article to be picked.

CITATION LIST

Patent Literature

[PTL 1] JP 2018-174003 A
[PTL 2] WO 2016/139850 A
[PTL 3] JP 2017-048024 A

SUMMARY OF INVENTION

Technical Problem

The worker wearing the device of PTL 1 can see an image of the indicator in the outside view in an actual visual field. However, in the device of PTL 1, since the indicator is displayed based on the position detected by the monocular camera, even if it is attempted to overlap and display the indicator on a target in the outside view, the worker cannot always visually recognize an image in which the indicator overlaps the target.

With the device of PTL 2, line-of-sight input can be performed by performing line-of-sight detection calibration. However, the device of PTL 2 needs to be arranged at a position where the line of sight of the user can be detected, and thus the line of sight cannot be accurately detected in a situation where the line of sight of the user cannot be detected.

With the terminal of PTL 3, by comparing the unique pattern captured by the camera with the information regarding the article displayed on the display unit, it is easy to perform the actual confirmation of the article to be picked. However, in the terminal of PTL 3, frequent focus movement is involved when alternately checking the information displayed by a hologram on the display unit and the article to be picked, and thus the worker easily feels eye fatigue and workability is deteriorated.

In general, when referring to an image displayed on AR glasses, the field of view of the image appearing in front of the eyes is narrow, and thus the field of view cannot cover the entire image. The user wearing the AR glasses focuses on the lens when referring to the image displayed on the lens, and focuses on the outside view when viewing the outside view. Therefore, the user wearing the AR glasses feels fatigue because the focus movement of the eyes frequently occurs, and it is difficult to continue wearing the AR glasses for a long time.

An object of the present invention is to provide an information display system that solves the above-described problems, displays an image in the entire visual field, and enables a user to recognize a target of an outside view without moving the focus of the eyes.

Solution to Problem

An information display system according to one aspect of the present invention includes a frame, a pair of cameras arranged at both side ends of the frame, a transparent display fitted into the frame, a display position setting device that detects a target based on a feature extracted from image data captured by the pair of cameras, and sets, as a display position, a position at which a straight line connecting an eye of a user wearing the frame and the target passes through the transparent display, and a controller that controls the transparent display in such a way as to display a point light at the display position set by the display position setting device.

A wearable device according to an aspect of the present invention includes a frame, a pair of cameras arranged at both side ends of the frame, a transparent display fitted into the frame, and a controller that controls the transparent display in such a way as to display a point light at a position at which a straight line connecting an eye of a user wearing the frame and a detection target passes through the transparent display based on image data captured by the pair of cameras.

Advantageous Effects of Invention

According to the present invention, it is possible to provide an information display system that displays an image in the entire visual field and enables a user to recognize a target of an outside view without moving the focus of the eyes.

BRIEF DESCRIPTION OF DRAWINGS

FIG. 12 is a table illustrating an example of correction information stored in the display position setting device according to the first example embodiment of the present invention.

EXAMPLE EMBODIMENT

Figure 1:
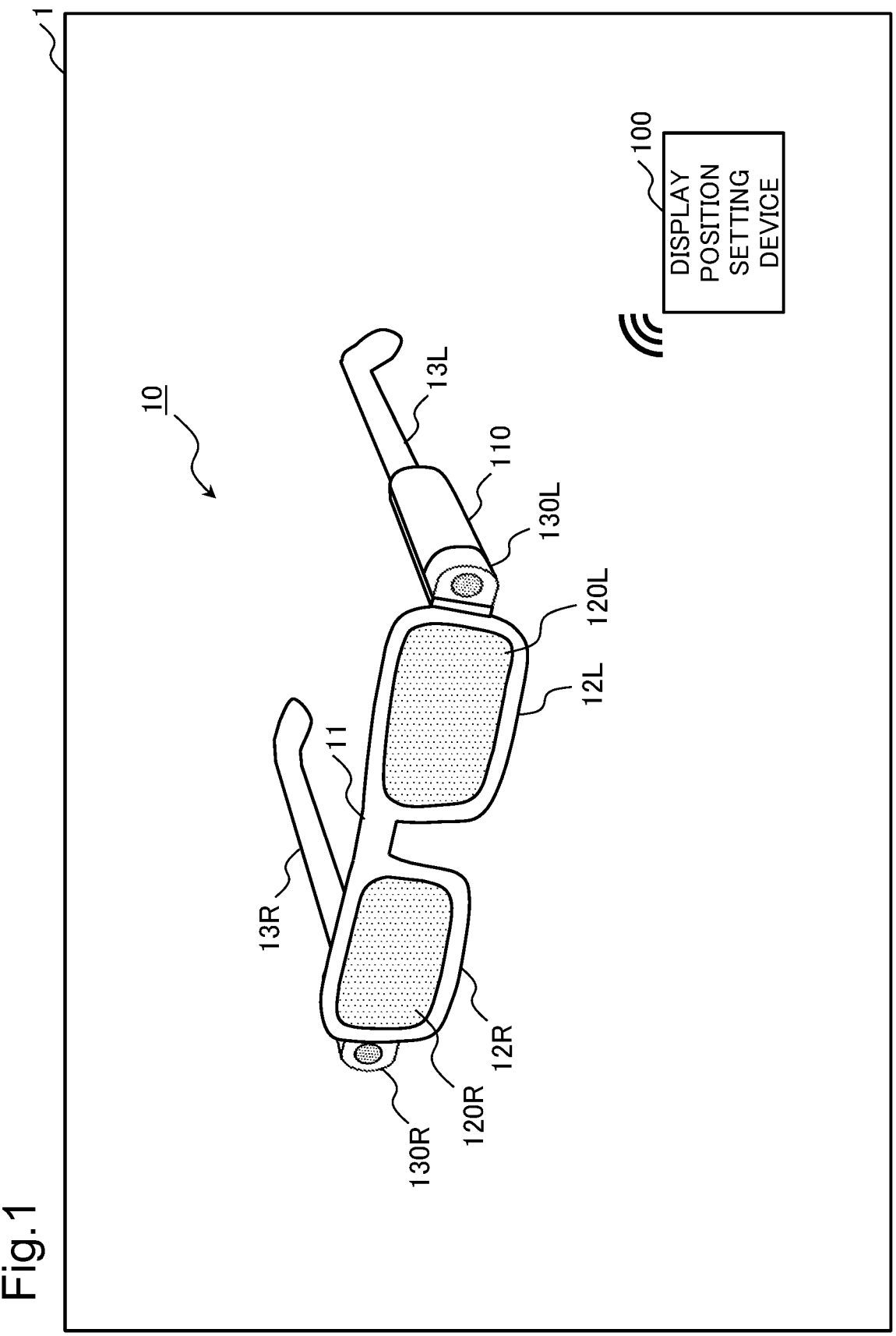
FIG. 1 is a conceptual diagram illustrating an example of a configuration of an information display system according to a first example embodiment of the present invention.

Hereinafter, example embodiments of the present invention will be described with reference to the drawings.

However, although the example embodiments to be described below are technically preferably limited in order to carry out the present invention, the scope of the invention is not limited to the following. In all the drawings used in the following description of the example embodiment, the same reference numerals are given to similar parts unless there is a particular reason. In the following example embodiments, repeated description of similar configurations and operations may be omitted.

First Example Embodiment

First, an information display system according to a first example embodiment of the present invention will be described with reference to the drawings. An information display system according to the present example embodiment includes a pair of cameras (stereo cameras) that captures an image of a field of view, and a glasses-type wearable device having a transparent display (hereinafter, referred to as a transparent display unit) that displays an image overlapping with a target that is present in the field of view. The information display system according to the present example embodiment includes a display position setting device that sets a position of an image displayed on the transparent display unit. In the following, at the ends of reference numerals of components of the wearable device, the alphabet R (for Right) is added to components on the right eye side, and alphabet L (for Light) is added to components on the left eye side. When the configurations of the right eye side and the left eye side are not distinguished, R and L at the ends of reference numerals may be omitted.

(Configuration)

FIG. 1 is a conceptual diagram illustrating an outline of a configuration of an information display system 1 according to the present example embodiment. As illustrated in FIG. 1, the information display system 1 includes a wearable device 10 and a display position setting device 100. In the following, an example in which the wearable device 10 and the display position setting device 100 are arranged at distant positions will be described, but the function (display position setting unit) of the display position setting device 100 may be configured to be incorporated in the wearable device 10.

The wearable device 10 includes a pair of rims 12 (rim 12L, rim 12R) connected by a bridge 11 and a pair of temples 13 (temple 13L, temple 13R) for positioning the rims 12 in front of the left and right eyes of the user. The bridge 11 and the rims 12 (rim 12L, rim 12R) constitute a frame. When the rims 12 (rim 12L, rim 12R) and the bridge 11 are integrally formed, the rims 12 (rim 12L, rim 12R) and the bridge 11 constitute an integrated frame.

The transparent display unit 120L and the transparent display unit 120R are fitted into lens portions of the rim 12L and rim 12R, respectively. A camera 130L and a camera 130R are installed on outer surfaces of the temple 13L and the temple 13R, respectively. A device control unit 110 (also referred to as a device controller) is installed on the outer surface of either the temple 13L or the temple 13R. Although the example of FIG. 1 illustrates an example in which the device control unit 110 is installed on the temple 13L, the device control unit 110 may be installed on the temple 13R, the bridge 11, the rim 12L, or the rim 12R.

As illustrated in FIG. 1, the wearable device 10 is a glasses-type device. By wearing the wearable device 10 like glasses, the user can recognize a light displayed on the transparent display unit 120 while viewing an outside view via the transparent display unit 120. The light displayed on the transparent display unit 120 is not an image with a clear shape but is a point light. The transparent display unit 120 is only required to be capable of displaying a point light having brightness to a degree that the worker can recognize the position of a target by overlapping the point light with the target to be visually recognized by the worker via the transparent display unit 120. The point light is not a point in a strict sense and is formed by at least one pixel. The point light may be formed by one pixel or a group of several pixels.

For example, the transparent display unit 120 is achieved by a transparent organic electro-luminescence (EL) display or a transparent micro light emitting diode (LED) display. The transparent display unit 120 may be achieved by a transparent inorganic EL display. A color point light can be displayed on the transparent display unit 120. The form of the transparent display unit 120 is not particularly limited as long as it is a transparent display that allows the user to visually recognize the outside view transmitted therethrough when it is worn by the user.

The wearable device 10 displays the point light on at least one of the transparent display unit 120L or the transparent display unit 120R at the time of calibration or target detection. At the time of calibration, the wearable device 10 displays a point light for correction (also referred to as a correction light) used for calibration on either the transparent display unit 120L or the transparent display unit 120R. At the time of pointing, the wearable device 10 causes both the transparent display unit 120L and the transparent display unit 120R to display a point light (also referred to as an aiming light) that is displayed to overlap with the target.

Figure 2:
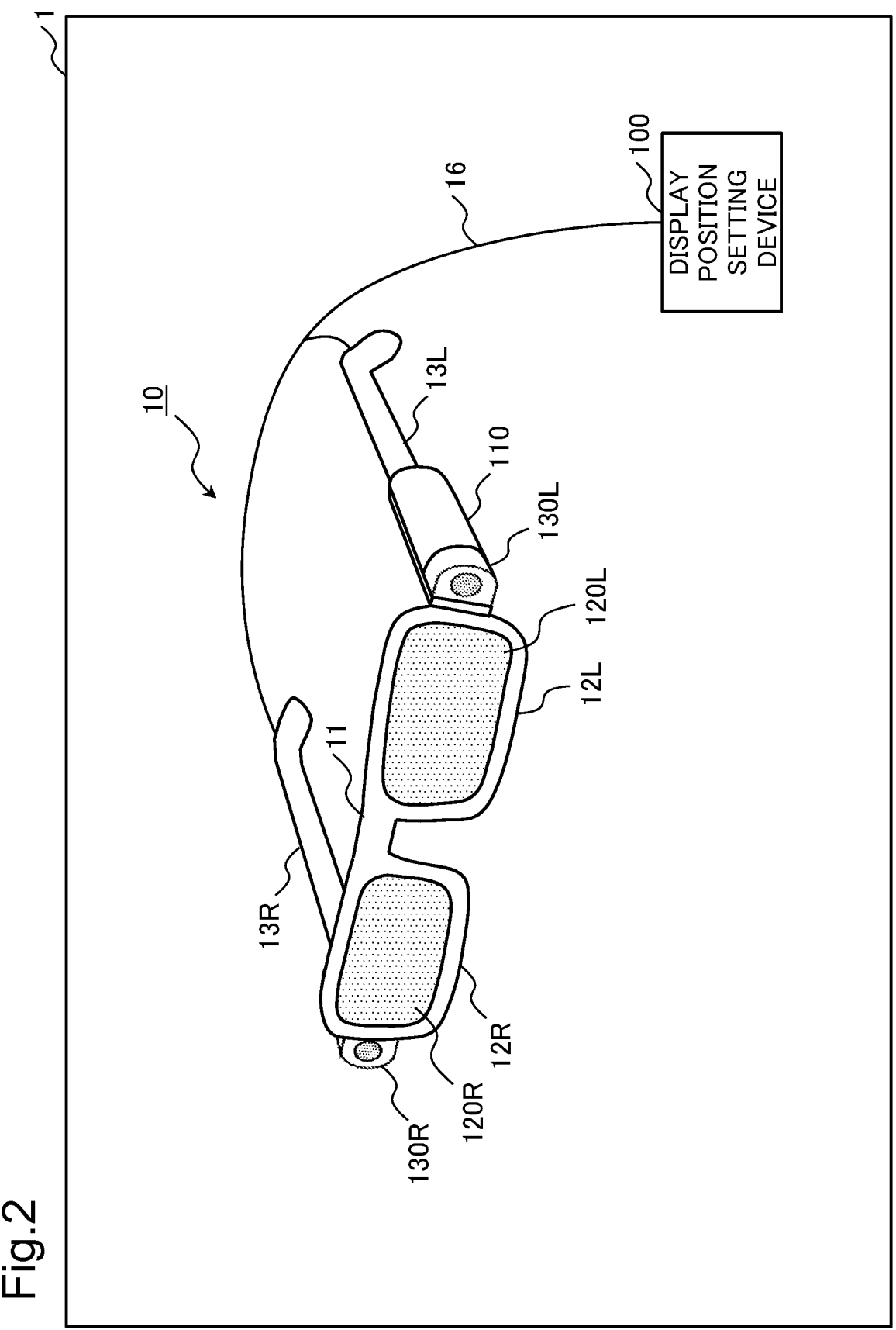
FIG. 2 is a conceptual diagram illustrating another example of the configuration of the information display system according to the first example embodiment of the present invention.

The wearable device 10 is connected to the display position setting device 100 so as to be capable of transmitting and receiving data. For example, the wearable device 10 is connected to the display position setting device 100 by short-range wireless communication such as Bluetooth (registered trademark). The wearable device 10 is connected to, for example, the display position setting device 100 by a wireless local area network (LAN) such as WiFi (registered trademark). The wearable device 10 may be connected to the display position setting device 100 by a wireless method other than Bluetooth or WiFi. The wearable device 10 may be connected by wire to the display position setting device 100 via a cable 16 as illustrated in FIG. 2 as long as workability of the user is not affected.

The camera 130L and the camera 130R are a pair of cameras that captures an image of an outside view and generates image data. The camera 130L and the camera 130R constitute a stereo camera. Information in the depth direction of the outside view can be measured from the position in image data of image-capturing by each of the camera 130L and the camera 130R. For example, the wearable device 10 can calculate a distance between the wearable device 10 and a target from a difference between pixel positions of the image data of image-capturing by the camera 130L and the camera 130R. The camera 130L and the camera 130R can be achieved by general digital cameras. The camera 130L and the camera 130R may be achieved by infrared cameras or ultraviolet cameras.

In the present example embodiment, calibration is performed using an indicator such as a fingertip of the user wearing the wearable device 10. At the time of calibration, the camera 130 generates image data (correction image) in which an indicator such as the fingertip of the user aligned with the correction light displayed on the transparent display unit 120 is captured. At the time of target detection, the camera 130 generates image data (detection image) for detecting a target. The camera 130 may be configured to capture an image at a predetermined timing, or may be configured to capture an image under control of the display position setting device 100.

The wearable device 10 transmits data including image data captured by the camera 130L and the camera 130R at the same timing to the display position setting device 100. At the time of calibration, the wearable device 10 transmits, to the display position setting device 100, calibration information in which the position of the correction light displayed on the transparent display unit 120L or the transparent display unit 120R is associated with the image data for correction. At the time of target detection, the wearable device 10 transmits, to the display position setting device 100, calibration information in which image data for target detection (detection image) is associated with the position of the correction light.

The display position setting device 100 is connected to the wearable device 10 so as to be capable of transmitting and receiving data wirelessly or by wire. For example, the display position setting device 100 can be achieved by an information processing device such as a computer or a server. The display position setting device 100 may also be achieved by, for example, a portable terminal such as a laptop personal computer, a tablet, a smartphone, or a mobile phone. The display position setting device 100 may be a dedicated device for executing processing related to the information display system 1, or may be achieved by a general-purpose device in which an application for executing the processing related to the information display system 1 is installed.

The display position setting device 100 receives data from the wearable device 10 at the time of calibration and target detection. At the time of calibration, the display position setting device 100 receives the calibration information from the wearable device 10. The display position setting device 100 analyzes image data (correction image) included in the received calibration information, and generates correction information associating the position of the correction light displayed on the transparent display unit 120 with the position of the indicator aligned by the user with the correction light. The display position setting device 100 stores the generated correction information. At the time of target detection, the wearable device 10 analyzes received image data (detection image) to detect the target. The display position setting device 100 corrects the position of the target on the detection image using the correction information, and transmits a position where the aiming light is displayed so as to overlap with the target on the transparent display unit 120 to the wearable device 10.

The display position setting device 100 may be configured to track the target in cooperation with an external system. For example, the external system detects the target based on information acquired by a camera, a sensor, or the like, and notifies the wearable device 10 of the position of the target via the display position setting device 100. Then, by displaying the position and direction of the notified target on the transparent display unit 120, the user wearing the wearable device 10 can easily find the target.

The image captured by the camera 130 has distortion due to the lens. Therefore, the display position setting device 100 performs image processing for removing distortion in the radial direction and the circumferential direction of the lens. The display position setting device 100 performs image processing such as normalization of a luminance value of an image. The display position setting device 100 performs image processing (also referred to as parallelization processing) of converting corresponding points of two images captured by the camera 130L and the camera 130R into the same row coordinates and aligning the rows of the two images. By performing the parallelization processing of aligning the rows of the two images, the dimension of processing of detecting the same target from the two images is changed from two-dimension to one-dimension.

The display position setting device 100 detects a target by performing matching processing on two pieces of image data subjected to distortion correction processing and parallelization processing. For example, the display position setting device 100 detects the target by a stereo corresponding point search in which the same point is searched in two images captured by the camera 130L and the camera 130R. As a matching algorithm used for the stereo corresponding point search, a block matching stereo algorithm can be used as an example. The algorithm used for detecting the target from the detection image by the display position setting device 100 is not limited to the block matching stereo algorithm as long as the target can be detected from the detection image. For example, the display position setting device 100 stores in advance a feature of a target to be detected, and detects the target from two images based on the feature. The display position setting device 100 may be configured to detect a target from two images, estimate a parallax between the targets in the two images, and calculate a distance between the wearable device 10 and the target from the estimated parallax based on the principle of triangulation.

Figure 3:
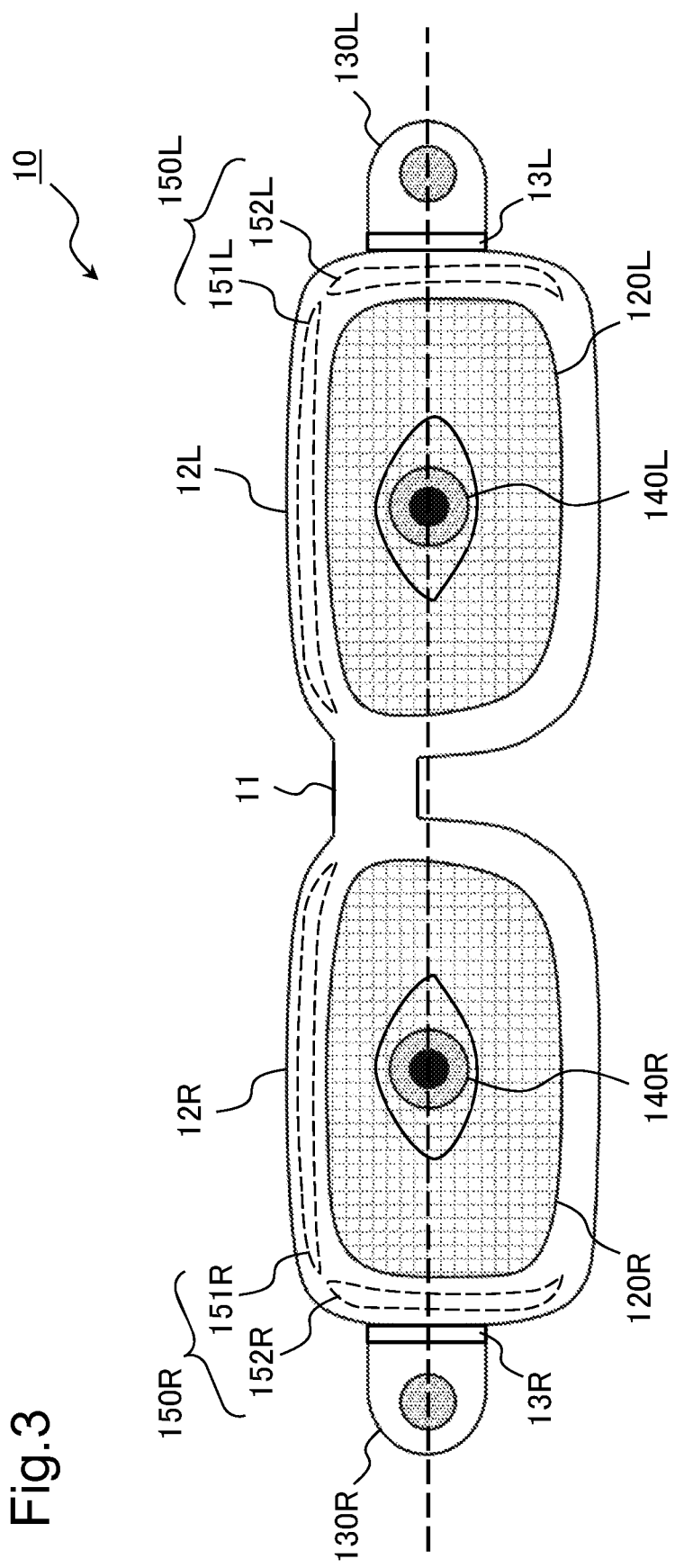
FIG. 3 is a conceptual diagram illustrating an example of an appearance of a wearable device according to the first example embodiment of the present invention.

FIG. 3 is a conceptual diagram for describing a positional relationship between the left eye 140L and the right eye 140R of the user wearing the wearable device 10 and the camera 130L and the camera 130R. As illustrated in FIG. 3, a straight line passing through the lens of the left camera 130L and the lens of the right camera 130R overlaps with a straight line connecting the left eye 140L and the right eye 140R of the user. That is, the camera 130L and the camera 130R, and the left eye 140L and the right eye 140R have the same positions in a vertical direction.

As illustrated in FIG. 3, a driver 150L and a driver 150R are mounted on the rim 12L and the rim 12R, respectively.

The driver 150L is a drive unit that causes the transparent display unit 120L to display an image. The driver 150L may be mounted inside the rim 12L, or may be mounted on a front surface or a back surface. The driver 150L has a first driver 151L that drives display in the vertical direction and a second driver 152L that drives display in a horizontal direction. The first driver 151L is arranged above the transparent display unit 120L. The second driver 152L is arranged on the left side (the right side in FIG. 3) of the transparent display unit 120L. The first driver 151L sets a display position in the vertical direction. The second driver 152L sets a display position in the horizontal direction. By driving the first driver 151L and the second driver 152L, it is possible to display the point light at any coordinates of the transparent display unit 120L.

Similarly, the driver 150R is a drive unit that causes the transparent display unit 120R to display an image. The driver 150R may be mounted inside the rim 12R, or may be mounted on the front surface or the back surface. The driver 150R has a first driver 151R that drives display in the vertical direction and a second driver 152R that drives display in the horizontal direction. The first driver 151R is arranged above the transparent display unit 120R. The second driver 152R is arranged on the right side (the left side in FIG. 3) of the transparent display unit 120R. The first driver 151R sets a display position in the vertical direction.

The second driver 152R sets a display position in the horizontal direction. By driving the first driver 151R and the second driver 152R, it is possible to display the point light at any coordinates of the transparent display unit 120R.

The outline of the configuration of the information display system 1 has been described above. Note that the configurations of FIGS. 1 to 3 are merely examples, and the configuration of the information display system 1 according to the present example embodiment is not limited to the mode as it is.

[Device Control Unit]

Figure 4:
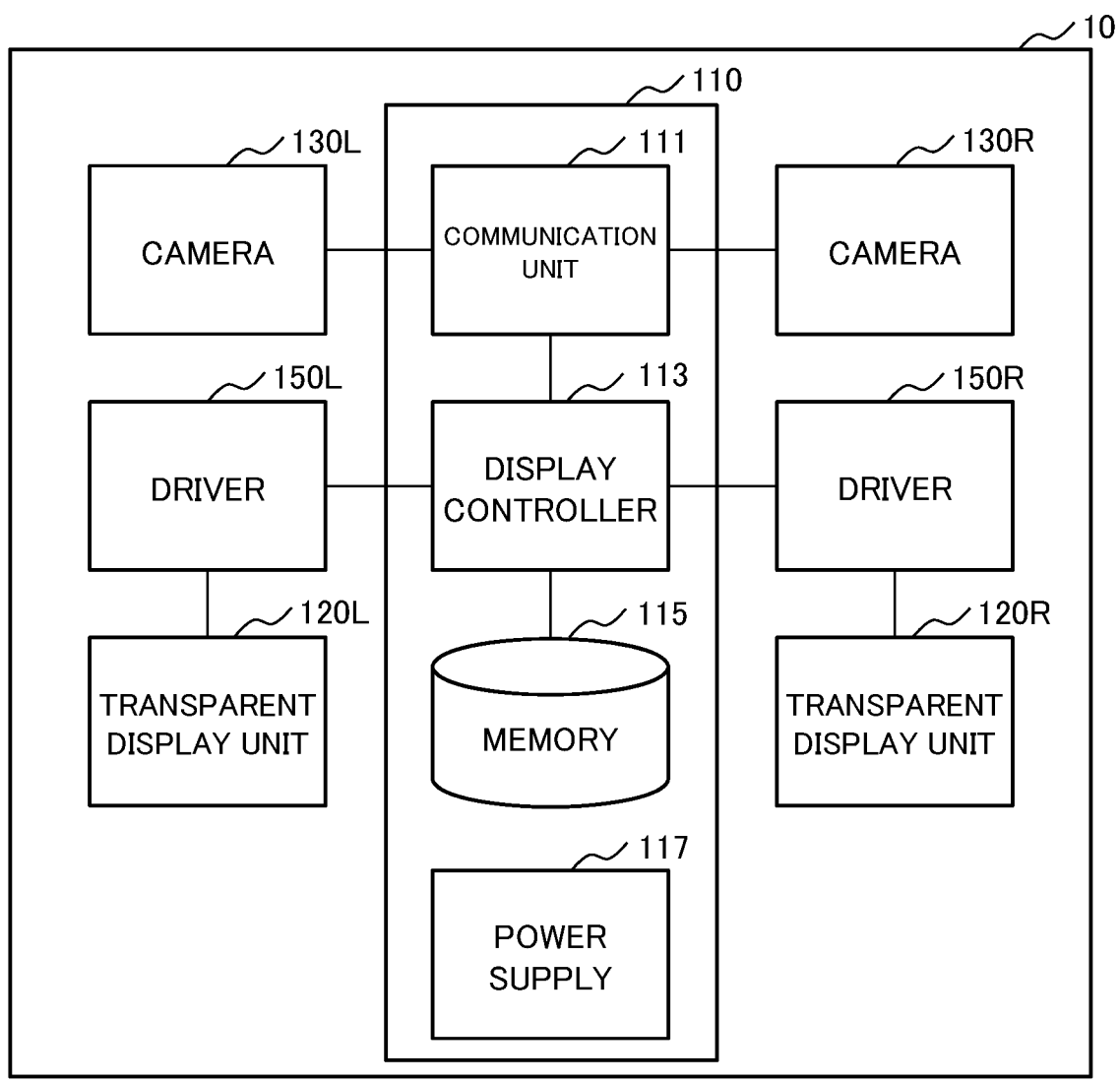
FIG. 4 is a conceptual diagram illustrating an example of a configuration of the wearable device according to the first example embodiment of the present invention.

Next, the device control unit 110 that controls the wearable device 10 will be described with reference to the drawings. FIG. 4 is a block diagram for describing a configuration of the device control unit 110 of the wearable device 10.

As illustrated in FIG. 4, the device control unit 110 includes a communication unit 111, a display controller 113, a memory 115, and a power supply 117.

The communication unit 111 is connected to the camera 130L and the camera 130R. The communication unit 111 is connected to the display position setting device 100 so that data can be transmitted and received wirelessly or by wire. The communication unit 111 acquires image data from the camera 130L and the camera 130R. The communication unit 111 transmits the acquired image data to the display position setting device 100.

The communication unit 111 is connected to the display controller 113. The communication unit 111 receives, from the display position setting device 100, display position information including the display position of a point light to be overlapped and displayed on a target. The communication unit 111 outputs the display position of an aim included in the received display position information to the display controller 113.

At the time of calibration, the communication unit 111 acquires image data (correction image) in which an indicator aligned with the aiming light displayed on the transparent display unit 120 is captured. At this time, the communication unit 111 acquires the position of the aiming light displayed on the transparent display unit 120 at the time of capturing the correction image from the display controller 113. The communication unit 111 generates calibration information in which the position of the aiming light displayed on the transparent display unit 120 at the time of capturing the correction image is associated with the acquired image data. The communication unit 111 transmits the generated calibration information to the display position setting device 100. The communication unit 111 may transmit the calibration information to the display position setting device 100 every time the correction image related to the aiming light is acquired, or may collectively transmit a plurality of pieces of calibration information generated by one time of calibration to the display position setting device 100.

The display controller 113 is connected to the communication unit 111, the memory 115, the driver 150L, and the driver 150R. At the time of calibration, the display controller 113 acquires an image of the aiming light to be displayed on the transparent display unit 120L or the transparent display unit 120R from the memory 115. The display controller 113 controls each of the driver 150L and the driver 150R so that the image of the aim is displayed at a predetermined timing on each of the transparent display unit 120L and the transparent display unit 120R. At the time of target detection, the display controller 113 acquires information regarding the aiming light to be displayed on the transparent display unit 120L or the transparent display unit 120R from the memory 115. The display controller 113 displays the aiming light at the display position acquired from the communication unit 111.

The memory 115 is connected to the display controller 113. The memory 115 stores information regarding the correction light and the aiming light to be displayed on the transparent display unit 120L and the transparent display unit 120R. For example, the memory 115 stores information regarding colors of the correction light, the aiming light, and the like to be displayed on the transparent display unit 120L and the transparent display unit 120R. Data regarding lights other than the correction light and the aiming light may be stored in the memory 115.

The power supply 117 is a secondary battery for driving the wearable device 10. For example, the power supply 117 is a secondary battery that can be charged by wireless power feeding. The power supply 117 may be a secondary battery that can supply power in a wired manner by a power cable.

The configuration of the device control unit 110 has been described above. Note that the configuration of FIG. 4 is an example, and the configuration of the device control unit 110 according to the present example embodiment is not limited to the mode as it is.

[Display Position Setting Device]

Figure 5:
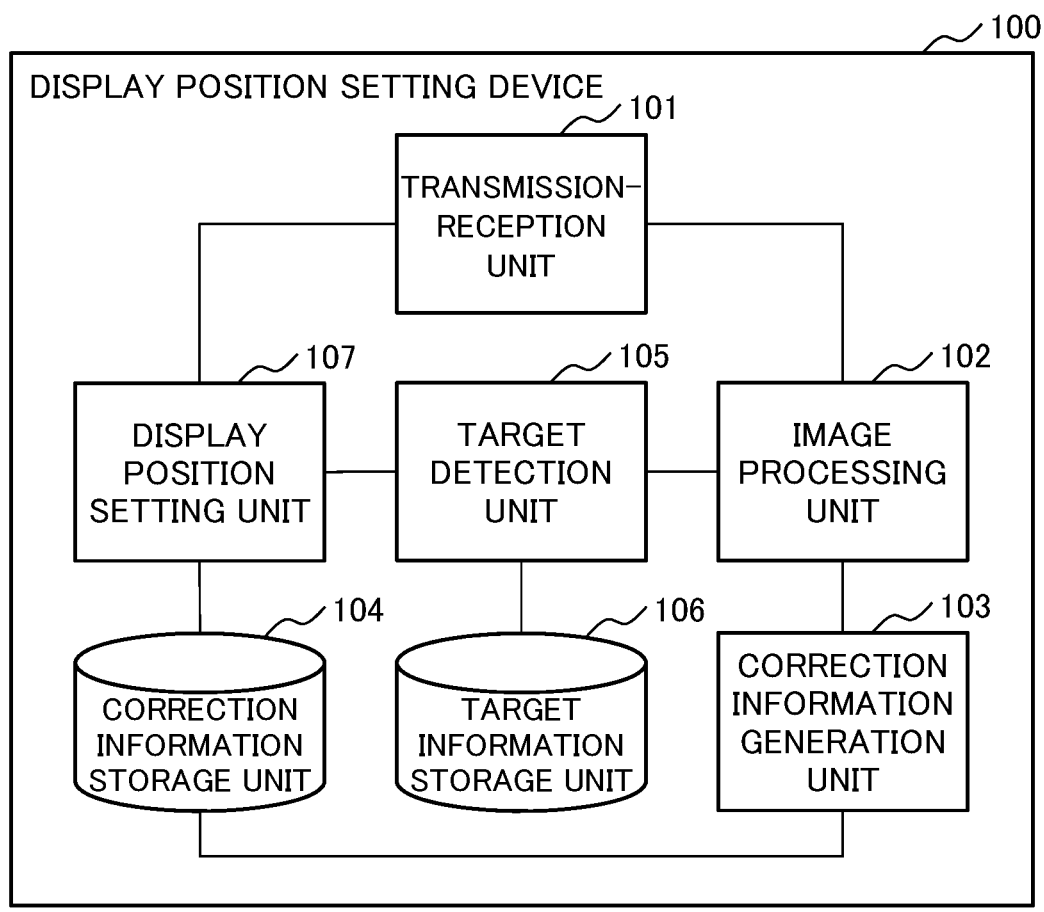
FIG. 5 is a conceptual diagram illustrating an example of a configuration of a display position setting device according to the first example embodiment of the present invention.

Next, the display position setting device 100 will be described with reference to the drawings. FIG. 5 is a block diagram for describing a configuration of the display position setting device 100. As illustrated in FIG. 5, the display position setting device 100 includes a transmission-reception unit 101, an image processing unit 102, a correction information generation unit 103, a correction information storage unit 104, a target detection unit 105, a target information storage unit 106, and a display position setting unit 107.

The transmission-reception unit 101 is connected to the image processing unit 102 and the display position setting unit 107. The transmission-reception unit 101 is connected to the wearable device 10 so that data can be transmitted and received wirelessly or by wire.

Upon receiving data including a correction image and a target detection image from the wearable device 10, the transmission-reception unit 101 outputs the received data to the image processing unit 102. Upon acquiring the display position information of the aiming light from the display position setting unit 107, the transmission-reception unit 101 transmits the display position information to the wearable device 10.

The image processing unit 102 is connected to the transmission-reception unit 101, the correction information generation unit 103, and the target detection unit 105. The image processing unit 102 performs image processing on acquired image data. For example, the image processing unit 102 performs image processing such as distortion removal, normalization of a luminance value, and parallelization. Upon acquiring an image for calibration, the image processing unit 102 performs image processing and outputs image data after the image processing to the correction information generation unit 103. Upon acquiring image data for target detection, the image processing unit 102 performs image processing and outputs the image data after the image processing to the target detection unit 105.

The correction information generation unit 103 is connected to the image processing unit 102 and the correction information storage unit 104. The correction information generation unit 103 acquires the correction image from the image processing unit 102. The correction information generation unit 103 analyzes the acquired correction image to detect the position of the indicator. The correction information generation unit 103 generates correction information associating the detected position of the indicator with the display position of the correction light displayed on the transparent display unit 120 at that time. The correction information generation unit 103 causes the generated correction information to be stored in the correction information storage unit 104.

The correction information storage unit 104 is connected to the correction information generation unit 103 and the display position setting unit 107. During calibration, the correction information generated by the correction information generation unit 103 is stored in the correction information storage unit 104. At the time of target detection, the correction information stored in the correction information storage unit 104 is referred to in response to access from the display position setting unit 107.

The target detection unit 105 is connected to the image processing unit 102, the target information storage unit 106, and the display position setting unit 107. The target detection unit 105 acquires image data for target detection from the image processing unit 102. Upon acquiring the image data, the target detection unit 105 acquires information (also referred to as target information) regarding the target to be detected from the target information storage unit 106, and detects the target from the image data based on the target information. Upon detecting the target, the target detection unit 105 extracts a position of the target. The target detection unit 105 outputs the extracted position of the target to the display position setting unit 107.

The target information storage unit 106 stores target information for detecting a detection target from image data. At the time of target detection, the target information storage unit 106 is accessed by the target detection unit 105, and the target information is referred to. For example, the target information storage unit 106 stores a feature of a target as the target information for detecting the target from image data. The target information stored in the target information storage unit 106 is not particularly limited as long as the target can be detected from the image data.

The display position setting unit 107 is connected to the transmission-reception unit 101, the correction information storage unit 104, and the target detection unit 105. The display position setting unit 107 acquires the position of the target detected by the target detection unit 105. Upon acquiring the position of the target, the display position setting unit 107 acquires the correction information from the correction information storage unit 104. The display position setting unit 107 corrects the acquired position of the target to the display position on the transparent display unit 120 using the correction information. The display position setting unit 107 outputs display position information including the position of the target after correction (the display position of the aiming light) to the transmission-reception unit 101. The display position setting unit 107 may add information such as the color of the aiming light to be displayed on the transparent display unit 120 to the display position information.

The configuration of the display position setting device 100 has been described above. Note that the configuration of FIG. 5 is an example, and the configuration of the display position setting device 100 according to the present example embodiment is not limited to the mode as it is.

[Calibration]

Next, calibration by the display position setting device 100 will be described with reference to the drawings. FIGS. 6 to 12 are diagrams for describing calibration by the display position setting device 100.

Figure 6:
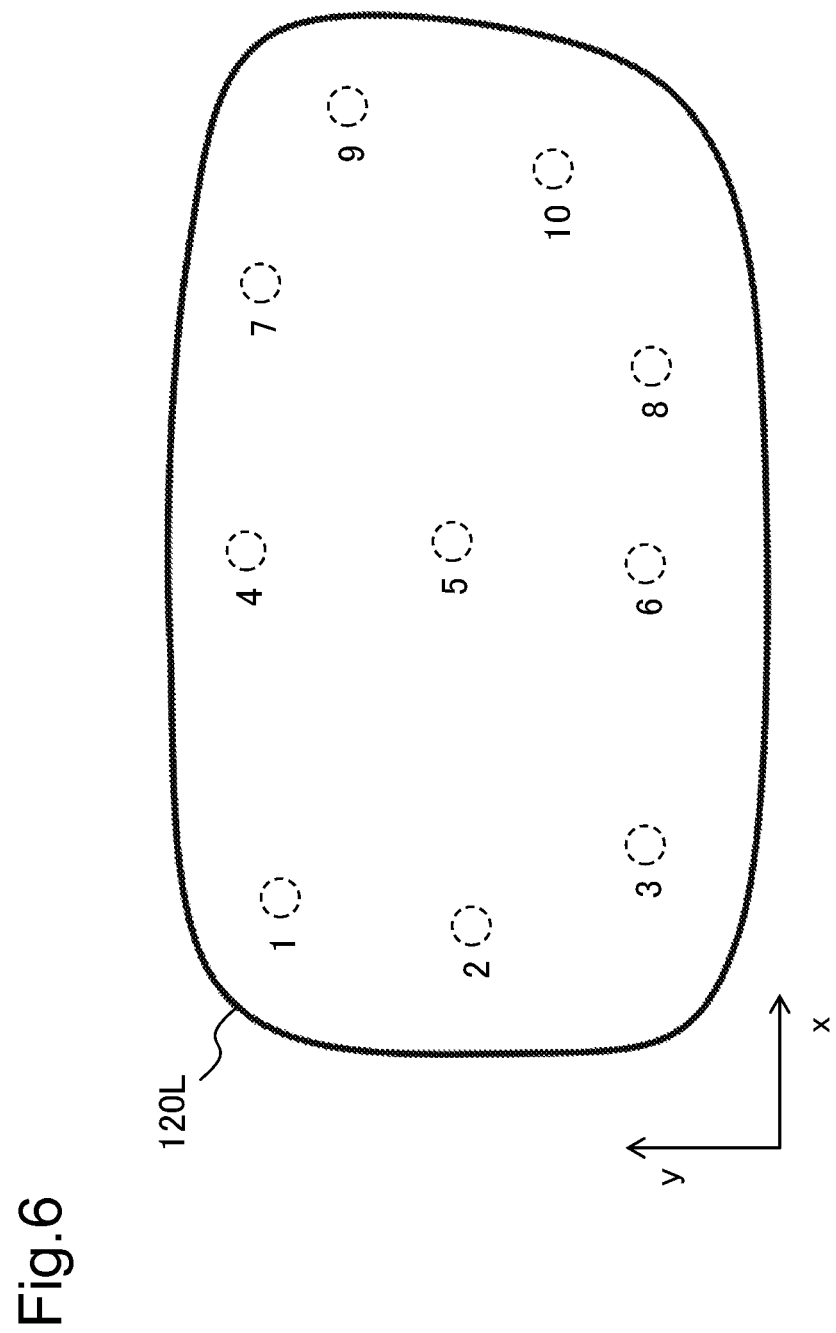
FIG. 6 is a conceptual diagram illustrating an example of a position at which an aim for calibration to be displayed on a transparent display unit of the wearable device according to the first example embodiment of the present invention is displayed.

FIG. 6 is a conceptual diagram for describing a position at which the correction light used for calibration is displayed on the transparent display unit 120L. The example of FIG. 6 is a diagram of the transparent display unit 120L viewed from the viewpoint of the user wearing the wearable device 10. The number of correction lights used for calibration is not limited to 10, and can be set to any number. The position of the correction light used for calibration is not limited to the example of FIG. 6, and can be set to any position.

In the example of FIG. 6, the correction light is displayed at positions of dashed circles indicated by numerals 1 to 10. The color of the correction light to be displayed is only required to be stored in advance in the memory 115 of the wearable device 10. The position, timing, and order of displaying the correction light is only required to be stored in advance in the memory 115 of the device control unit 110 of the wearable device 10.

For example, the wearable device 10 displays the correction light in ascending or descending order at the positions of dashed circles indicated at 1 to 10. The wearable device 10 may display the correction light at random at the positions of dashed circles indicated by 1 to 10. The wearable device 10 may switch the display position of the correction light at a preset timing, or may switch in response to a switching instruction from the display position setting device 100. For example, the position of the correction light can be expressed by a relative coordinate system set in the transparent display unit 120R and the transparent display unit 120L. FIG. 6 illustrates an example of expressing relative coordinates in an xy coordinate system. The position of the origin of the relative coordinate system set in the transparent display unit 120R and the transparent display unit 120L can be set to any position as long as it is fixed with respect to the transparent display unit 120R and the transparent display unit 120L.

Figure 7:
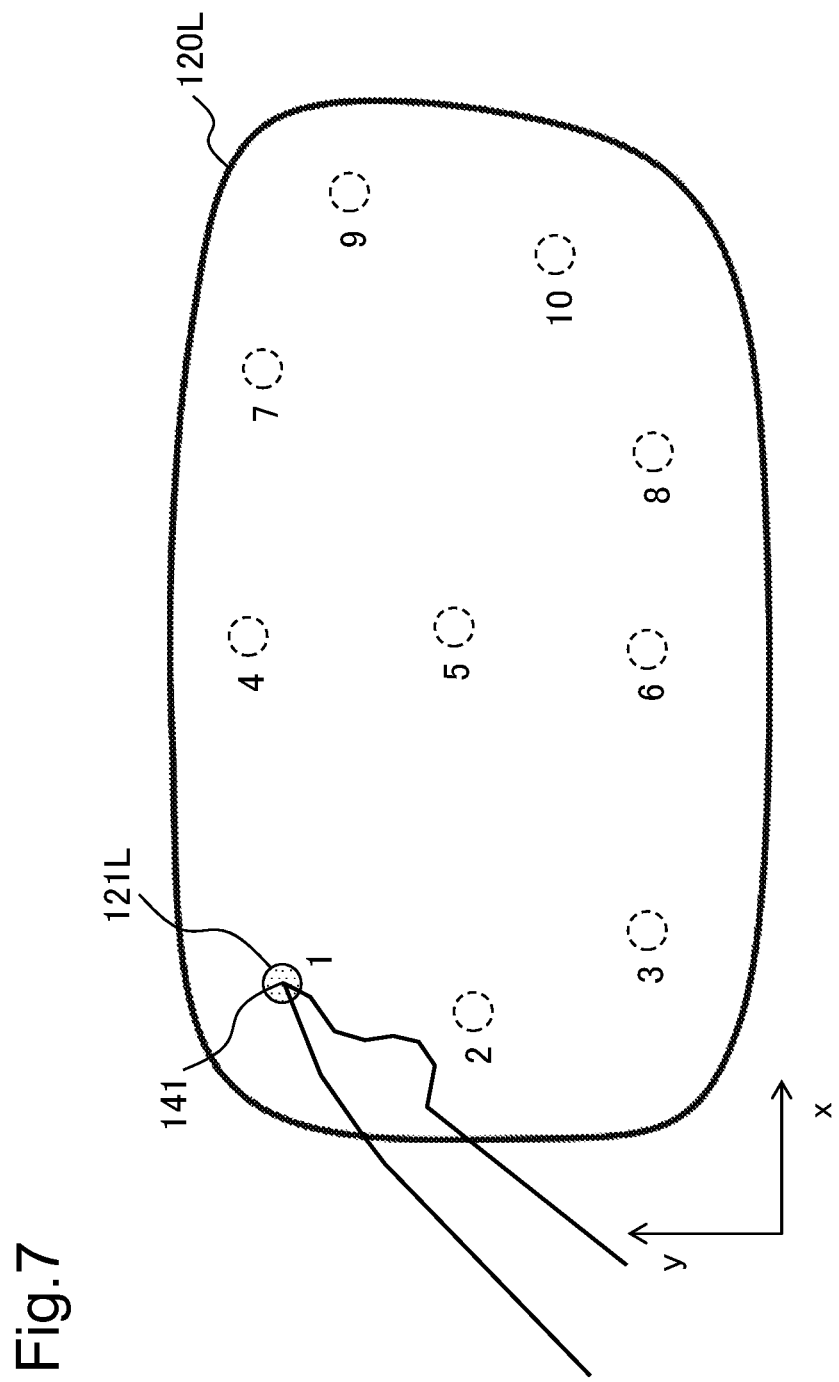
FIG. 7 is a conceptual diagram illustrating an example in which a user aligns a fingertip with an aim displayed on the transparent display unit of the wearable device according to the first example embodiment of the present invention.

FIG. 7 is a conceptual diagram illustrating a state in which the user who has visually recognized a correction light 121L displayed on the transparent display unit 120L places the fingertip (indicator 141) at a position overlapping with the correction light 121L. Calibration using the correction light 121L displayed on the transparent display unit 120L is for aligning the positions of the indicator 141 and the correction light 121L visually recognized by the left eye. Calibration for aligning the position of the aim with the indicator 141 visually recognized by the right eye is separately performed using the transparent display unit 120R.

Figure 8:
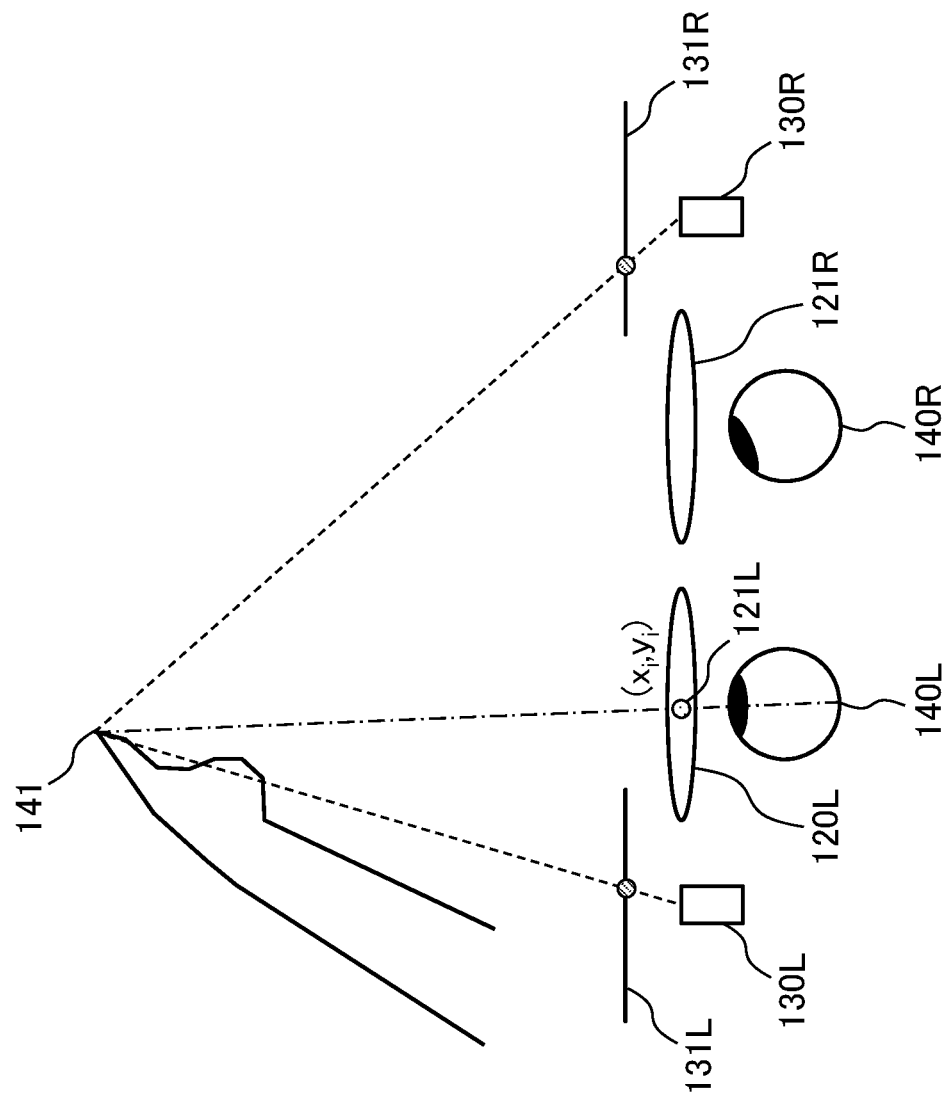
FIG. 8 is a conceptual diagram for describing an example in which a user wearing the wearable device according to the first example embodiment of the present invention calibrates a left transparent display unit.

FIG. 8 is a conceptual diagram illustrating a state of overlooking from above the user visually recognizing the indicator 141 by aligning with the correction light 121L displayed at the position $(x_i, y_i)$ of the transparent display unit 120L at the time of calibration for the left eye. As illustrated in FIG. 8, in the calibration for the left eye, both the left camera 130L and the right camera 130R capture an image of the indicator 141. At this time, the camera 130L and the camera 130R capture an image of the indicator 141 located on a straight line connecting the left eye 140L of the user looking at the correction light 121L displayed on the transparent display unit 120L and the correction light 121L. The wearable device 10 generates two pieces of image data (left image 131L, right image 131R) captured by the camera 130L and the camera 130R at the same timing and calibration information associated with the display position of the correction light 121L. The wearable device 10 transmits the generated calibration information to the display position setting device 100.

Figure 9:
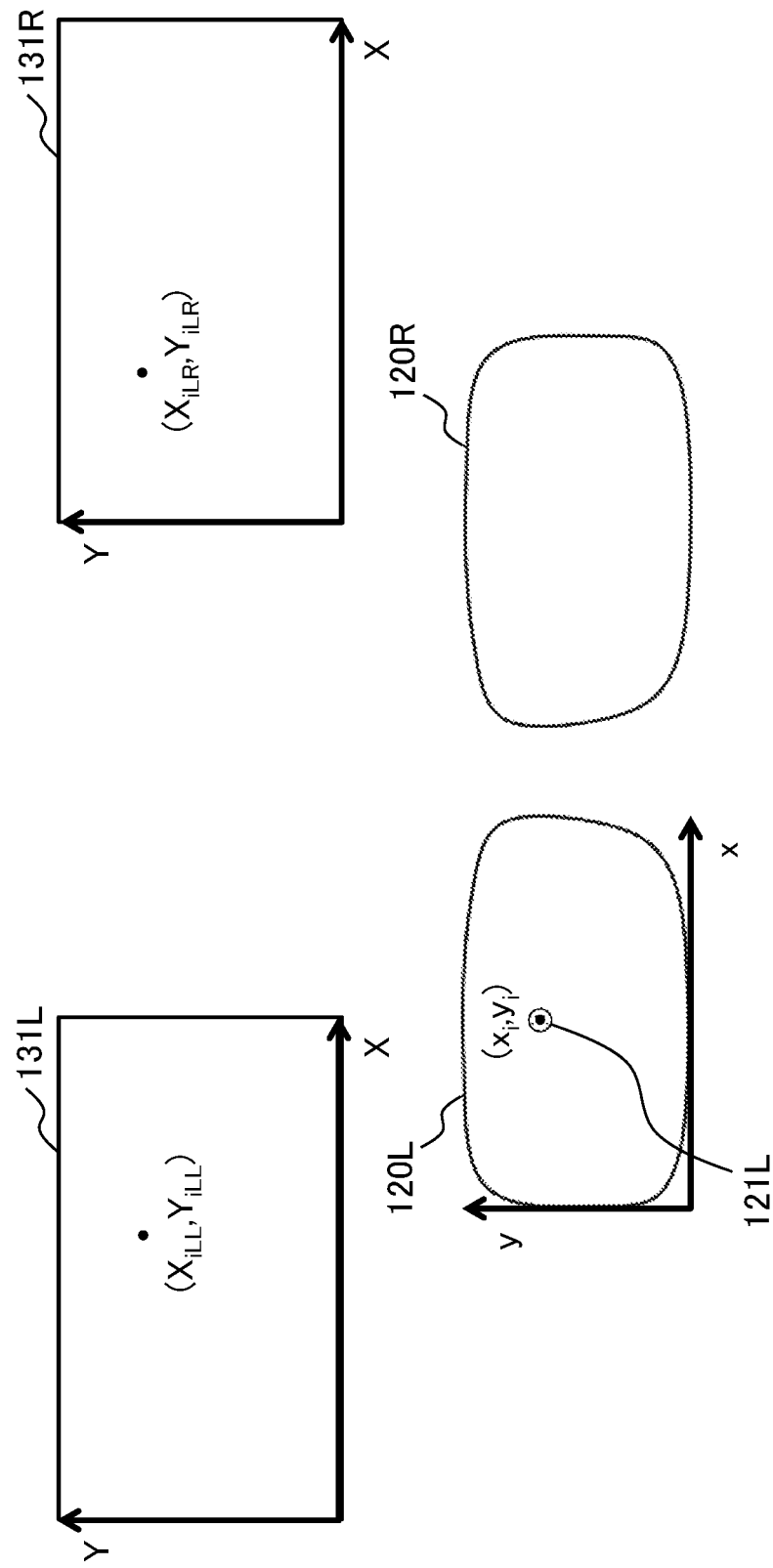
FIG. 9 is a conceptual diagram for describing a correspondence relationship between a position on the transparent display unit and a position on a correction image when the user wearing the wearable device according to the first example embodiment of the present invention calibrates the left transparent display unit.

FIG. 9 is a conceptual diagram for describing the position of the indicator 141 captured in the left image 131L and the right image 131R when the user visually recognizes the indicator 141 by aligning with the correction light 121L of the transparent display unit 120L. FIG. 9 illustrates an example in which the same coordinate system (XY coordinate system) is set for the left image 131L and the right image 131R.

As illustrated in FIG. 9, a parallax occurs at the positions of the indicators 141 captured in the left image 131L and the right image 131R. The position of the indicator 141 in the left image 131L is ($X_{iLL}$, $Y_{iLL}$). The position of the indicator 141 in the right image 131R is ($X_{iLR}$, $Y_{iLR}$). The display position setting device 100 stores the position ($X_{iLL}$, $Y_{iLL}$) in the left image 131L and the position ($X_{iLR}$, $Y_{iLR}$) in the right image 131R in association with the position ($x_i$, $y_i$) of the correction light 121L displayed on the transparent display unit 120. The display position setting device 100 stores the position in the left image 131L and the position in the right image 131R in association with each other with respect to a plurality of positions on the transparent display unit 120L.

Figure 10:
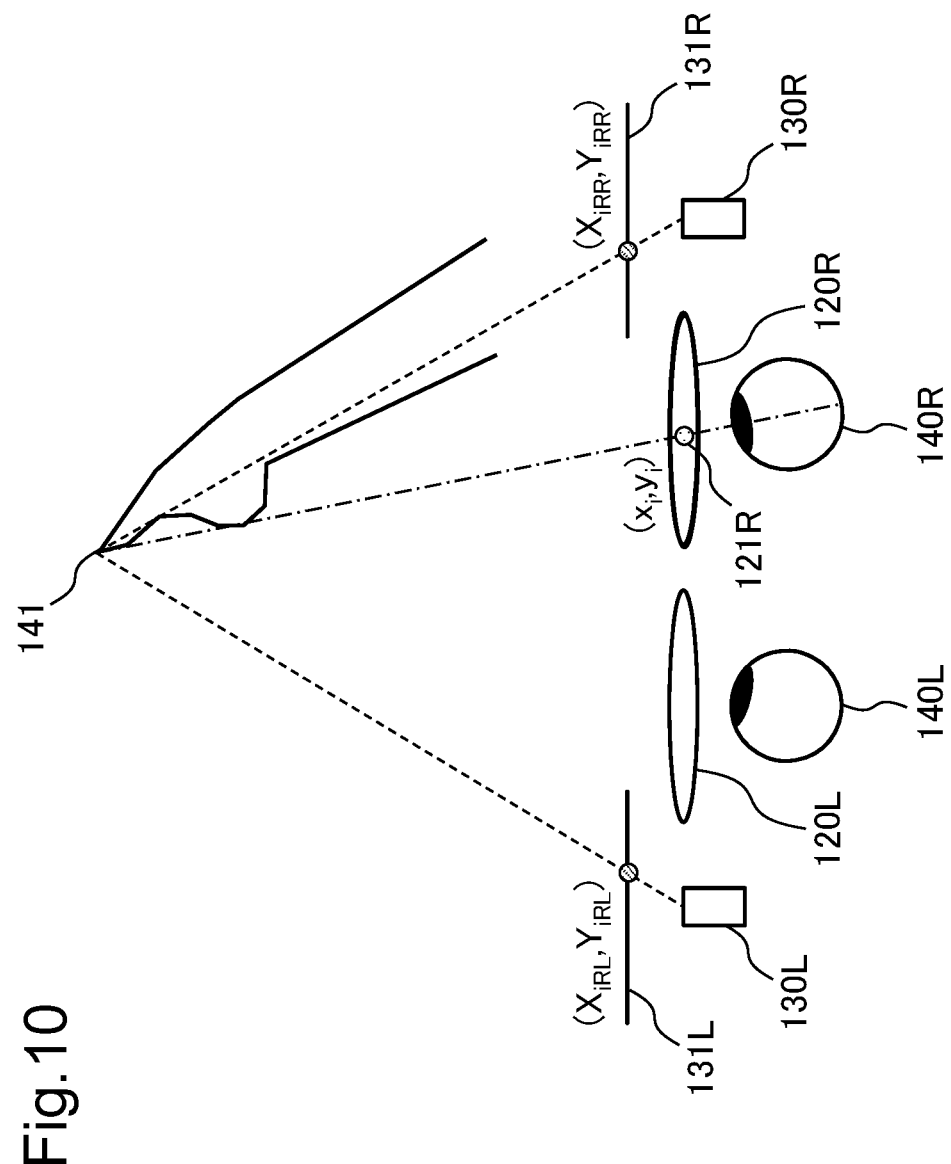
FIG. 10 is a conceptual diagram for describing an example in which the user wearing the wearable device according to the first example embodiment of the present invention calibrates a right transparent display unit.

FIG. 10 is a conceptual diagram illustrating a state of overlooking from above the user visually recognizing the indicator 141 by aligning with the correction light 121R displayed at the position ($x_i$, $y_i$) of the transparent display unit 120R at the time of calibration for the right eye. As illustrated in FIG. 10, in the calibration for the right eye, both the left camera 130L and the right camera 130R capture an image of the indicator 141. At this time, the camera 130L and the camera 130R capture an image of the indicator 141 located on a straight line connecting the right eye 140R of the user looking at the correction light 121R (correction light) displayed on the transparent display unit 120R and the correction light 121R. The wearable device 10 generates two pieces of image data (left image 131L, right image 131R) captured by the camera 130L and the camera 130R at the same timing and calibration information associated with the display position of the correction light 121R. The wearable device 10 transmits the generated calibration information to the display position setting device 100.

Figure 11:
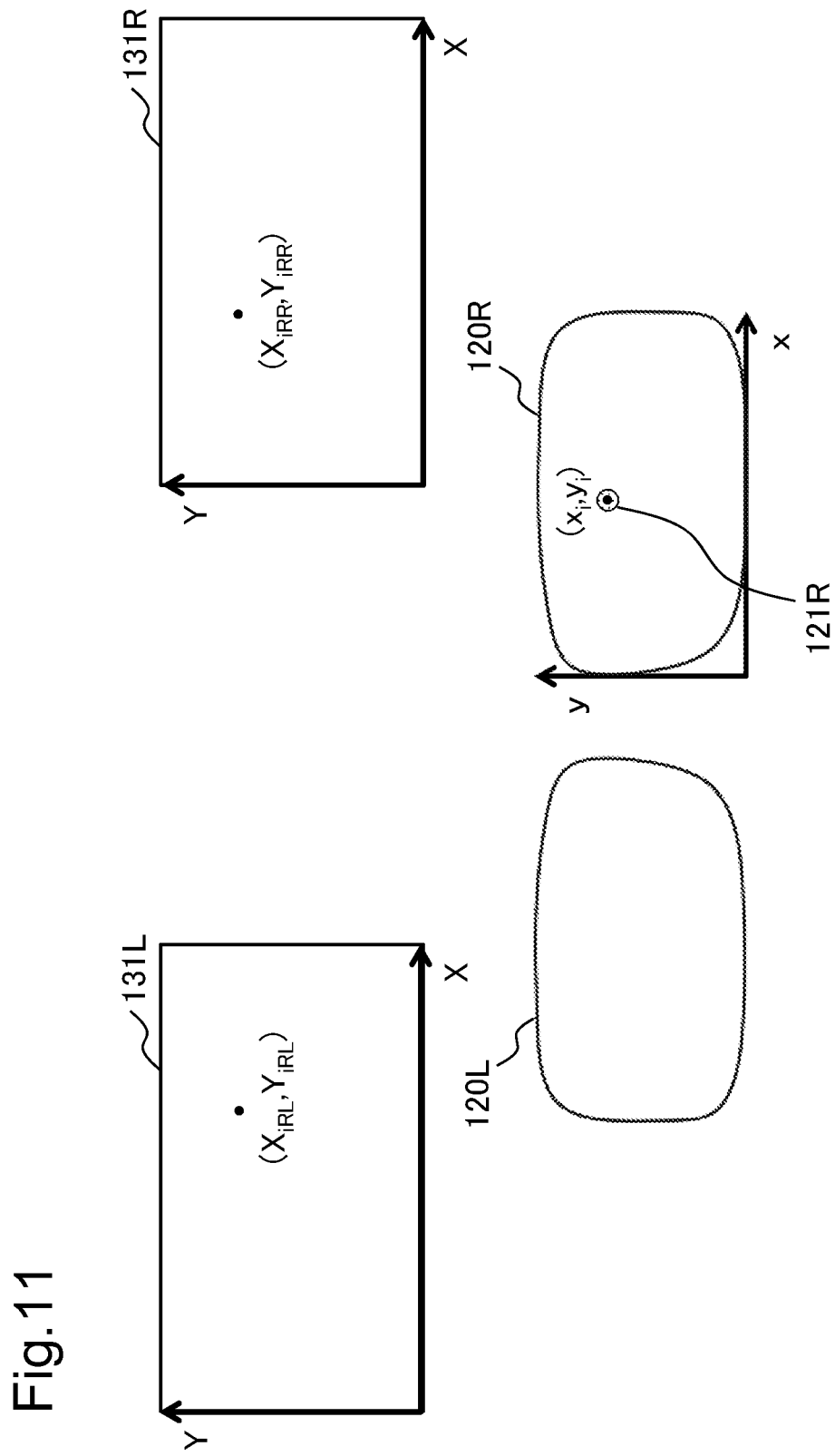
FIG. 11 is a conceptual diagram for describing a correspondence relationship between a position on the transparent display unit and a position on a correction image when the user wearing the wearable device according to the first example embodiment of the present invention calibrates the right transparent display unit.

FIG. 11 is a conceptual diagram for describing the position of the indicator 141 captured in the left image 131L and the right image 131R when the user visually recognizes the indicator 141 by aligning with the correction light 121R displayed on the transparent display unit 120R. FIG. 11 illustrates an example in which the same coordinate system (XY coordinate system) is set for the left image 131L and the right image 131R. As illustrated in FIG. 11, a parallax occurs at the positions of the indicators 141 captured in the left image 131L and the right image 131R. The position of the indicator 141 in the left image 131L is ($X_{iRL}$, $Y_{iRL}$). The position of the indicator 141 in the right image 131R is ($X_{iRR}$, $Y_{iRR}$). The display position setting device 100 stores the position ($X_{iRL}$, $Y_{iRL}$) in the left image 131L and the position ($X_{iRR}$, $Y_{iRR}$) in the right image 131R in association with the position ($x_i$, $y_i$) of the aim displayed on the transparent display unit 120. The display position setting device 100 stores the position on the left image 131L and the position on the right image 131R in association with each other with respect to a plurality of positions on the transparent display unit 120R.

FIG. 12 is a table (correction information table 170) illustrating an example of the correction information stored in the display position setting device 100. The correction information table 170 stores correction information for the transparent display unit 120L on the left side and correction information for the transparent display unit 120R on the right side. The correction information table 170 stores correction data associating coordinate systems set for the transparent display unit 120L and the transparent display unit 120R with coordinate systems set for image data captured by the camera 130R and the camera 130L.

For example, a first aim is displayed at the position ($x_i$, $y_i$) of the transparent display unit 120L. The position ($x_i$, $y_i$) of the left transparent display unit 120L is associated with the position ($X_{iLL}$, $Y_{iLL}$) of the left image 131L and the position ($X_{iLR}$, $Y_{iLR}$) of the right image 131R. Similarly, the position ($X_{iLL}$, $Y_{iLL}$) of left image 131L and the position ($X_{iLR}$, $Y_{iLR}$) of right image 131R are associated with the position ($x_i$, $y_i$) of the left transparent display unit 120L.

[Target Detection]

Figure 13:
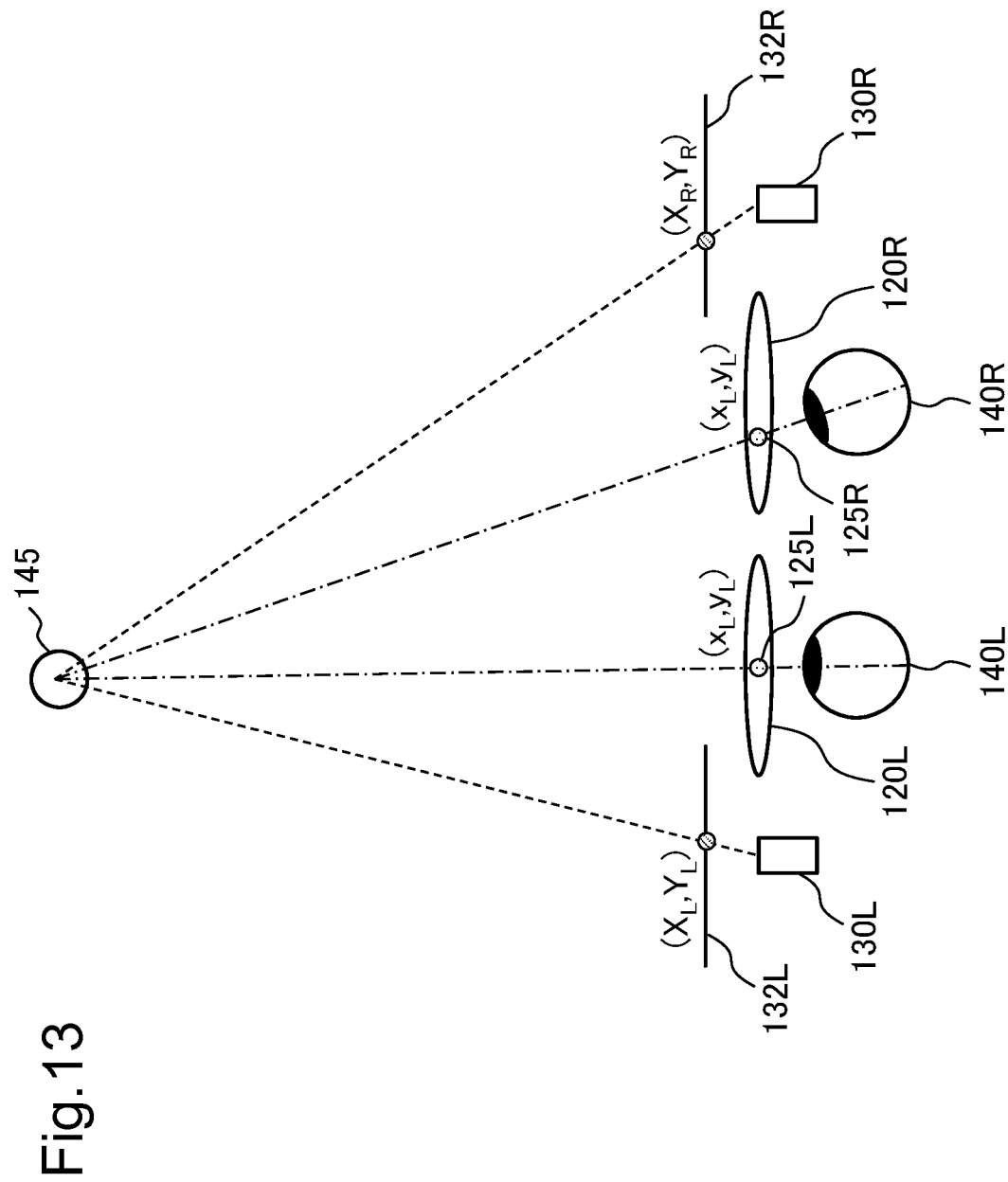
FIG. 13 is a conceptual diagram for describing an example in which aims are displayed on the transparent display units so as to overlap with a target detected by the wearable device according to the first example embodiment of the present invention.
Figure 14:
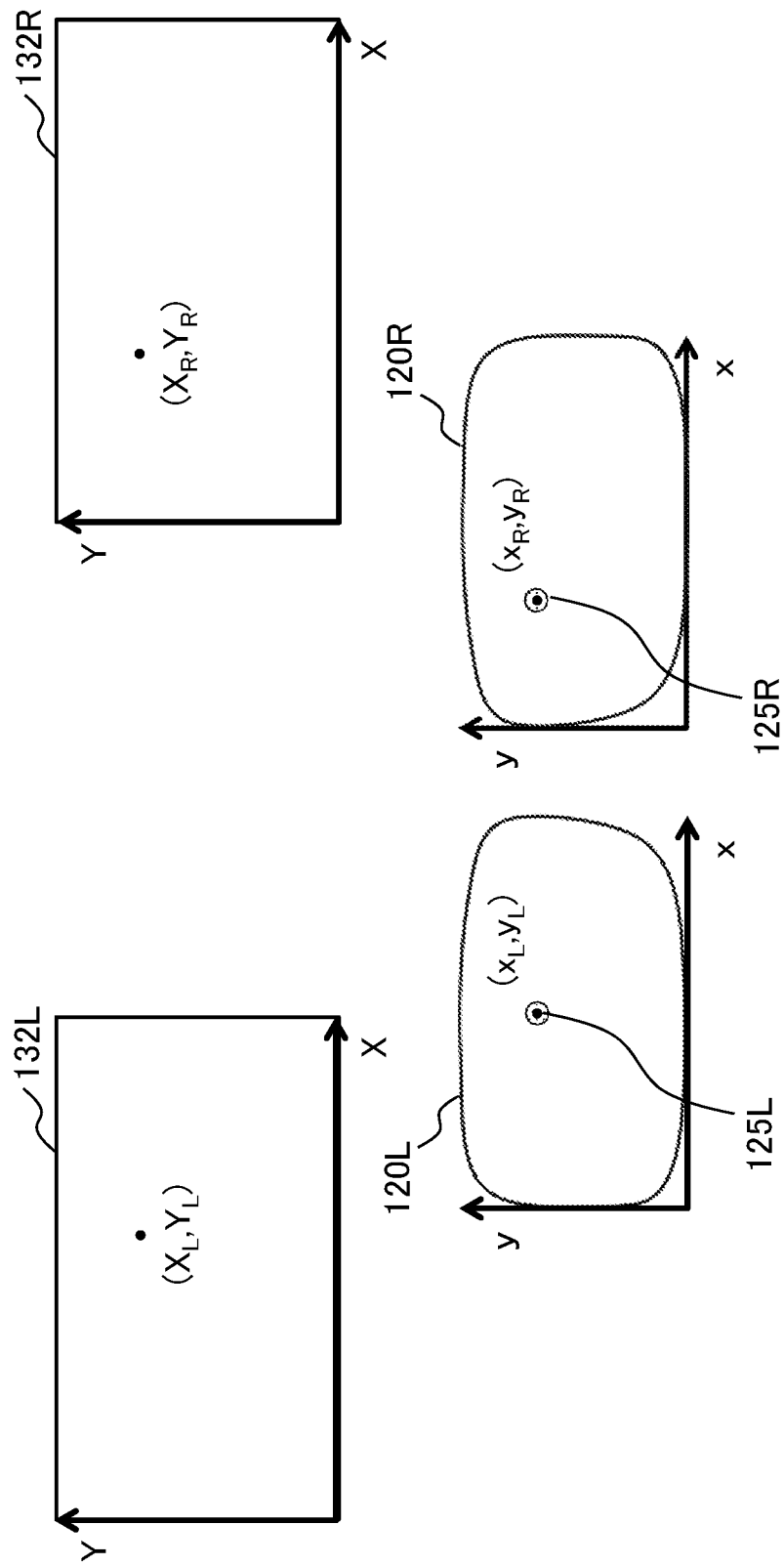
FIG. 14 is a conceptual diagram for describing a position of an aim displayed on the transparent display units so as to overlap with a target detected by the wearable device according to the first example embodiment of the invention.

Next, target detection by the display position setting device 100 will be described with reference to the drawings. FIGS. 13 to 14 are diagrams for describing target detection by the display position setting device 100.

FIGS. 13 and 14 are conceptual diagrams for describing an example of displaying aiming lights 125 on the transparent display units 120 so as to overlap with a target 145 based on image data (detection image) captured by the camera 130 at the time of target detection.

The left camera 130L generates a left image 132L by capturing an image of an outside view. At the same timing, the right camera 130R generates a right image 132R by capturing an image of the outside view. The wearable device 10 transmits the generated left image 132L and right image 132R (detection images) to the display position setting device 100.

The display position setting device 100 receives the left image 132L and the right image 132R (detection image) from the wearable device 10. The display position setting device 100 detects the target 145 from the left image 132L and right image 132R with reference to the target information. The target 145 is captured at a position ($X_L$, $Y_L$) in the left image 132L, and the target 145 is captured at a position ($X_R$, $Y_R$) in the right image 132R. The display position setting device 100 extracts the position ($X_L$, $Y_L$) of the target 145 from the left image 132L, and extracts the position ($X_R$, $Y_R$) of target 145 from the right image 132R.

The display position setting device 100 corrects the position ($X_L$, $Y_L$) extracted from the left image 132L and the position ($X_R$, $Y_R$) extracted from the right image 132R to the position ($X_L$, $Y_L$) in the transparent display unit 120L based on the correction information. Similarly, the display position setting device 100 corrects the position ($X_L$, $Y_L$) extracted from the left image 132L and the position ($X_R$, $Y_R$) extracted from the right image 132R to the position ($X_R$, $Y_R$) in the transparent display unit 120R based on the correction information. The display position setting device 100 transmits display position information including the position ($X_L$, $Y_L$) of an aiming light 125L to be displayed on the transparent display unit 120L and the position ($X_R$, $Y_R$) of an aiming light 125R to be displayed on the transparent display unit 120R to the wearable device 10.

The wearable device 10 receives the display position information including the display position of the aiming light 125 displayed on each of the transparent display unit 120L and the transparent display unit 120R from the display position setting device 100. The wearable device 10 displays the aiming light 125L at the position ($X_L$, $Y_L$) of the transparent display unit 120L and displays the aiming light 125R at the position ($X_R$, $Y_R$) of the transparent display unit 120R.

The user wearing the wearable device 10 perceives the aiming light 125L displayed at the position ($X_L$, $Y_L$) of the transparent display unit 120L with the left eye 140L, and perceives the aiming light 125R displayed at the position ($X_R$, $Y_R$) of the transparent display unit 120R with the right eye 140R. The user can recognize the target 145 appears to overlap with the aiming light 125L perceived by the left eye 140L and the aiming light 125R perceived by the right eye 140R.

The configuration and function of the information display system 1 according to the present example embodiment have been described above. Note that the configuration and function illustrated in FIGS. 1 to 14 are merely examples, and the configuration and function of the information display system 1 according to the present example embodiment are not limited to the mode as it is. In the above example, an example has been described in which the aiming light 125 is displayed on both of the transparent display unit 120L and the transparent display unit 120R, but it may be configured to display the aiming light 125 on either the transparent display unit 120L or the transparent display unit 120R.

(Operation)

Next, operations of the wearable device 10 and the display position setting device 100 included in the information display system 1 according to the present example embodiment will be described with reference to the drawings. Hereinafter, calibration processing and pointing processing by the wearable device 10, and correction information generation processing and aim position generation processing by the display position setting device 100 will be described in order.

[Calibration Processing]

Figure 15:
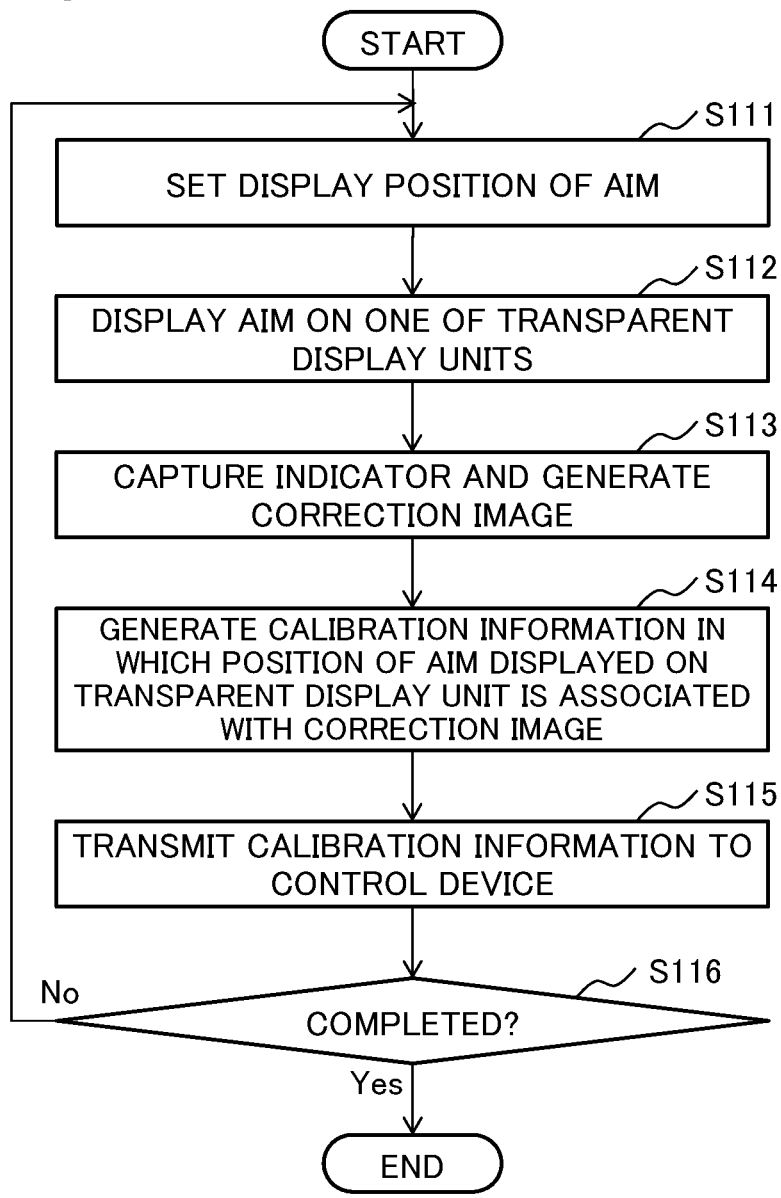
FIG. 15 is a flowchart for describing calibration processing by the wearable device according to the first example embodiment of the present invention.

FIG. 15 is a flowchart for describing calibration processing by the wearable device 10. In the description of the processing along the flowchart of FIG. 15, the wearable device 10 is the main body of operation.

In FIG. 15, first, the wearable device 10 sets a position at which the correction light 121 is displayed on the transparent display unit 120L or the transparent display unit 120R (step S111).

Next, the wearable device 10 displays the correction light 121 on the transparent display unit 120L or the transparent display unit 120R (step S112).

Next, the wearable device 10 generates a correction image by capturing an image of an indicator aligned with the correction light 121 displayed on the transparent display unit 120L or the transparent display unit 120R with the camera 130L and the camera 130R (step S113).

Next, the wearable device 10 generates calibration information in which the position of the correction light 121 displayed on the transparent display unit 120L or the transparent display unit 120R is associated with the pair of correction images captured by the camera 130L and the camera 130R (step S114).

Next, the wearable device 10 transmits the generated calibration information to the display position setting device 100 (step S115).

When the calibration processing is continued (No in step S116), the processing returns to step S111 to repeat the processing. When the calibration processing is completed (Yes in step S116), the processing according to the flowchart in FIG. 15 ends. The completion timing of the calibration processing may be determined by the user wearing the wearable device 10, or may be determined by the preset number of times or time of the calibration processing.

In the processing along the flowchart of FIG. 15, the procedure of transmitting the calibration information to the display position setting device 100 every time the calibration information related to one correction light 121 is generated has been described. It may be configured to collectively transmit the configuration information regarding several correction lights 121 to the display position setting device 100.

[Pointing Processing]

Figure 16:
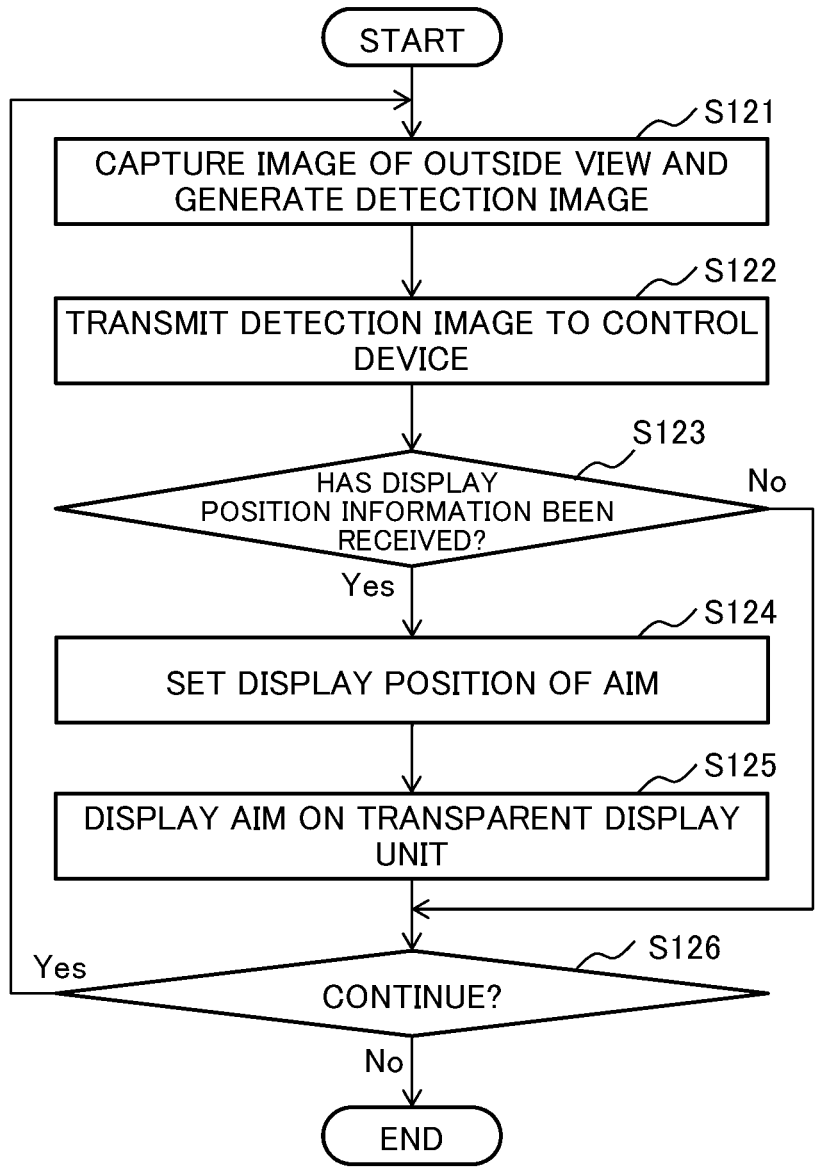
FIG. 16 is a flowchart for describing pointing processing by the wearable device according to the first example embodiment of the present invention.

FIG. 16 is a flowchart for describing pointing processing by the wearable device 10. In the description of the processing along the flowchart of FIG. 16, the wearable device 10 is the main body of operation.

In FIG. 16, first, the wearable device 10 captures an image of an outside view including a target and generates image data for target detection (also referred to as a detection image) (step S121).

Next, the wearable device 10 transmits the generated detection image to the display position setting device 100 (step S122).

Here, when the display position information is received from the display position setting device 100 (Yes in step S123), the display position of the aiming light 125 is set in the transparent display unit 120L and the transparent display unit 120R based on the received display position information (step S124). When the display position information is not received from the display position setting device 100 (No in step S123), the processing proceeds to step S126.

After step S124, the wearable device 10 displays the aiming light 125 at the set display position with respect to the transparent display unit 120 (step S125).

When the pointing processing is continued (Yes in step S126), the processing returns to step S121 to repeat the processing. When the pointing processing is completed (No in step S125), the processing according to the flowchart in FIG. 16 ends. The completion timing of the pointing processing may be determined by the user wearing the wearable device 10, or may be determined by the preset number of times or time of the pointing processing.

The operation of the wearable device 10 has been described above. Note that the flowcharts illustrated in FIGS. 15 and 16 are examples, and the operation of the wearable device 10 is not limited to the procedure as it is.

[Display Position Setting Device]

Figure 17:
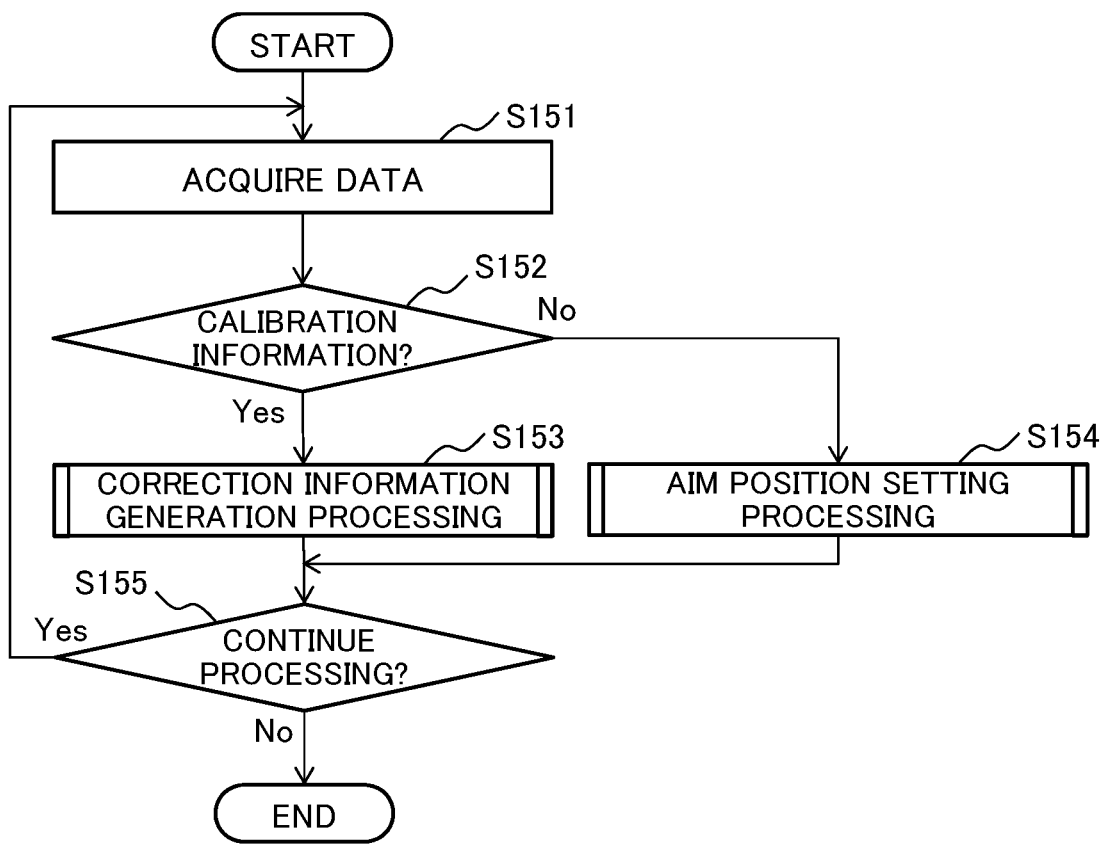
FIG. 17 is a flowchart for describing an outline of operation of the display position setting device according to the first example embodiment of the present invention.

FIG. 17 is a flowchart for describing an outline of operation of the display position setting device 100. In the description of processing along the flowchart of FIG. 17, the display position setting device 100 is the main body of operation.

In FIG. 17, first, the display position setting device 100 acquires data from the wearable device 10 (step S151).

When the acquired data is the calibration information (Yes in step S152), the display position setting device 100 executes correction information generation processing (step S153). After step S153, when the processing is continued (Yes in step S155), the processing returns to step S151. When the processing is not continued (No in step S155), the processing according to the flowchart of FIG. 17 is ended.

On the other hand, when the acquired image data is not the calibration information but the detection image (No in step S152), the display position setting device 100 executes aim position generation processing (step S154). After step S154, when the processing is continued (Yes in step S155), the processing returns to step S151. When the processing is not continued (No in step S155), the processing according to the flowchart of FIG. 17 is ended. The completion timing of the processing may be determined by the user wearing the wearable device 10, or may be determined by the preset number of times or time of the processing.

[Correction Information Generation Processing]

Figure 18:
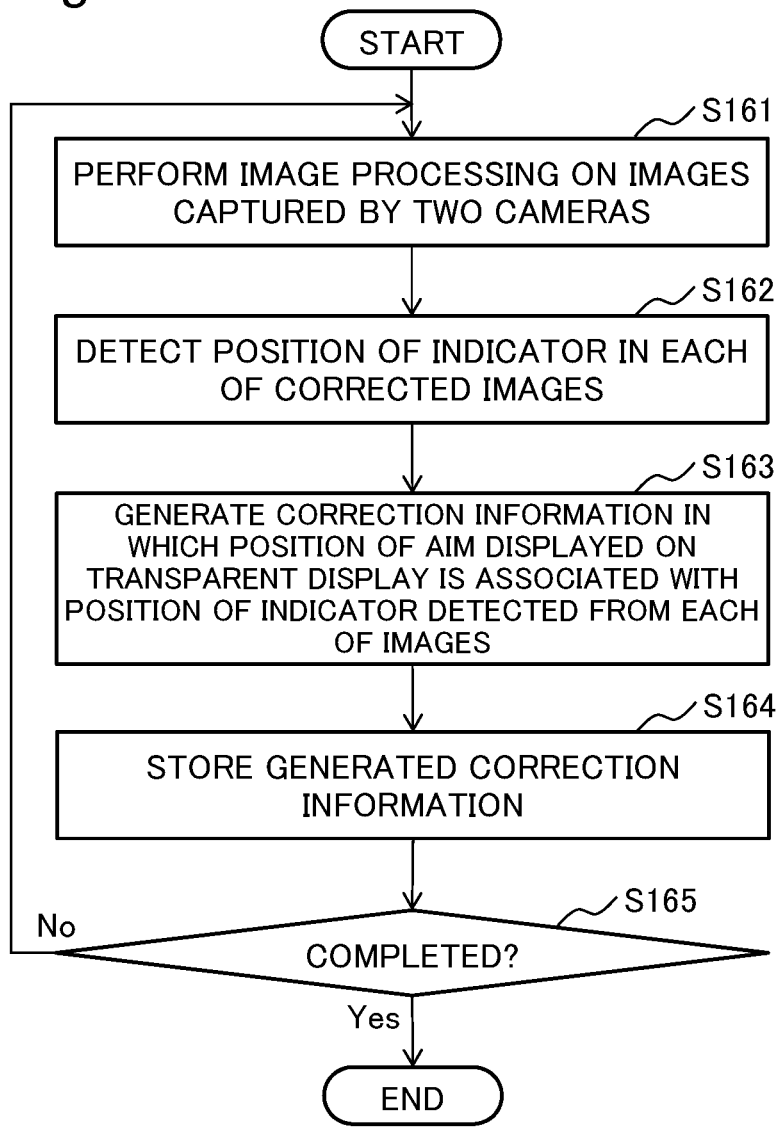
FIG. 18 is a flowchart for describing correction information generation processing by the display position setting device according to the first example embodiment of the present invention.

FIG. 18 is a flowchart for describing the correction information generation processing by display position setting device 100. In the description of the processing along the flowchart of FIG. 18, the display position setting device 100 is the main body of operation.

In FIG. 18, first, the display position setting device 100 performs image processing on the left image captured by the camera 130L and the right image captured by the camera 130R (step S161).

Next, the display position setting device 100 detects the position of the indicator from each of the left image and the right image after the image processing (step S162).

Next, the display position setting device 100 generates correction information in which the position of the correction light 121 displayed on the transparent display unit 120L or the transparent display unit 120R is associated with the position of the indicator detected from each of the left image and the right image after the image processing (step S163).

Then, the display position setting device 100 stores the correction information generated for the transparent display unit 120L and the transparent display unit 120R (step S164).

When the correction information generation processing is continued (No in step S165), the processing returns to step S161. When the correction information generation processing is completed (Yes in step S165), the processing according to the flowchart in FIG. 18 ends. The completion timing of the correction information generation processing may be determined by the user wearing the wearable device 10, or may be determined by the preset number of times or time of the correction information generation processing.

[Aim Position Generation Processing]

Figure 19:
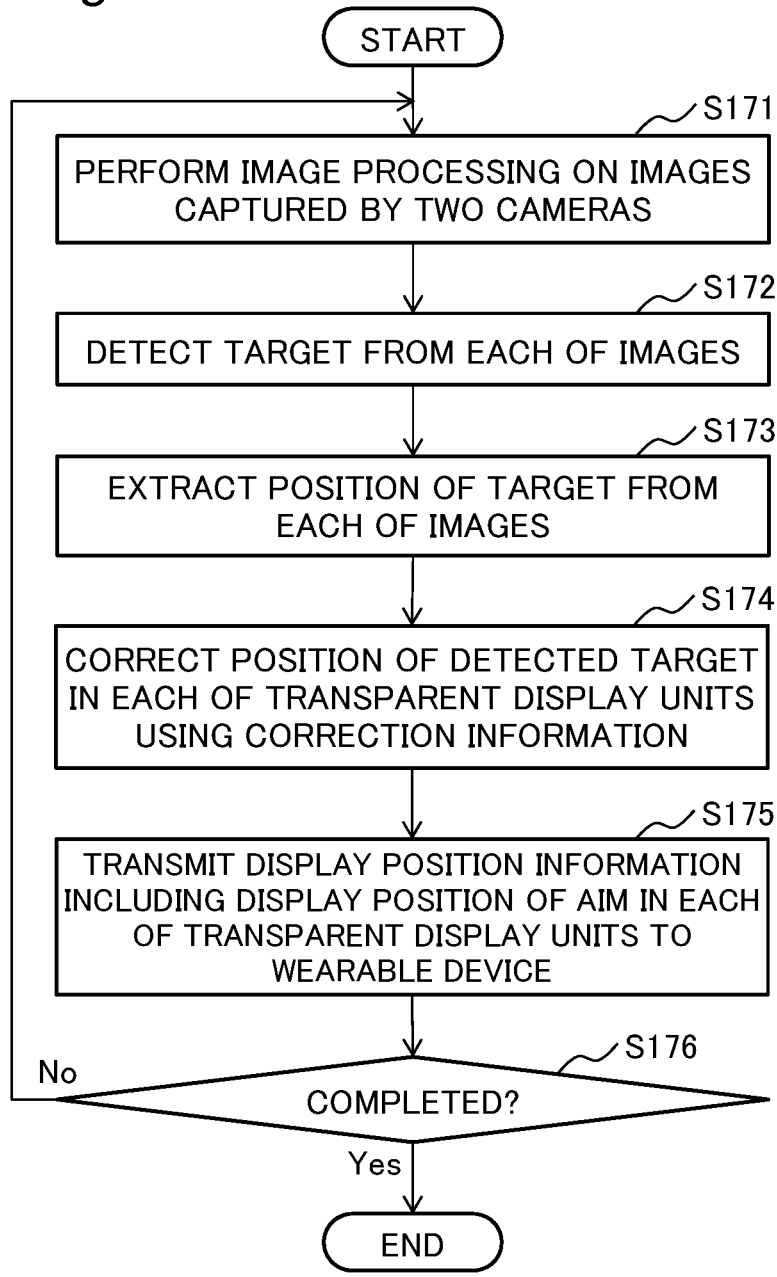
FIG. 19 is a flowchart for describing aim position setting processing by the display position setting device according to the first example embodiment of the present invention.

FIG. 19 is a flowchart for describing aim position setting processing by the display position setting device 100. In the description of the processing along the flowchart of FIG. 19, the display position setting device 100 is the main body of operation.

In FIG. 19, first, the display position setting device 100 performs image processing on each of the left image captured by the camera 130L and the right image captured by the camera 130R (step S171).

Next, the display position setting device 100 detects the position of the target from each of the left image and the right image after the image processing (step S172).

Next, the display position setting device 100 extracts the position of the target detected from each of the left image and the right image after the image processing (step S173).

Next, the display position setting device 100 corrects the position of the target detected from each of the left image and the right image to the position in each of the transparent display unit 120L and the transparent display unit 120R based on the correction information (step S174). The position in the transparent display unit 120L and the transparent display unit 120R after correction corresponds to the display position of the aiming light 125 in each of the transparent display unit 120L and the transparent display unit 120R.

Then, the display position setting device 100 transmits display position information including the display position of the aiming light 125 in each of the transparent display unit 120L and the transparent display unit 120R to the wearable device 10 (step S175).

When the aim position setting processing is continued (No in step S176), the processing returns to step S171. When the aim position setting processing is completed (Yes in step S176), the processing according to the flowchart in FIG. 19 ends. The completion timing of the aim position setting processing may be determined by the user wearing the wearable device 10, or may be determined by the preset number of times or time of the aim position setting processing.

The operation of the display position setting device 100 has been described above. Note that the flowcharts illustrated in FIGS. 17 to 19 are merely examples, and the operation of the display position setting device 100 is not limited to the procedure as it is.

As described above, the information display system according to the present example embodiment includes a wearable device and a display position setting device. The display position setting device detects a target based on a feature extracted from image data captured by the pair of cameras, and sets, as a display position, a position at which a straight line connecting an eye of the user wearing the frame and the target passes through the transparent display. The wearable device includes a frame, a pair of cameras arranged at both side ends of the frame, a transparent display fitted into the frame, and a controller that controls the transparent display in such a way as to display a point light at the display position set by the display position setting device.

As one aspect of the present example embodiment, the transparent display includes a first transparent display and a second transparent display. The frame has a first rim arranged in front of one eye of a user and into which the first transparent display is fitted, and a second rim arranged in front of another eye of the user and into which the second transparent display is fitted. The display position setting device sets a position at which a straight line connecting the one eye and the target passes through the first transparent display as a first display position based on the two pieces of the image data captured by the pair of cameras. The display position setting device sets a position at which a straight line connecting the another eye and the target passes through the second transparent display as a second display position based on the two pieces of the image data captured by the pair of cameras. The controller includes a first controller and a second controller. The first controller controls the first transparent display in such a way as to display the point light at the first display position set by the display position setting device. The second controller controls the second transparent display in such a way as to display the point light at the second display position set by the display position setting device.

As one aspect of the present example embodiment, the information display system executes calibration processing and a correction information generation processing in order to associate a position in image data captured by a pair of cameras with a position on a transparent display. In the calibration processing, the controller causes the transparent display to display the correction light to be used for calibration. The controller causes the pair of cameras to capture an image of an indicator located on a straight line connecting an eye of the user looking at the correction light displayed on the transparent display and the correction light, and acquires two pieces of the image data captured by the pair of cameras. The controller generates calibration information in which the acquired two pieces of the image data are associated with a position of the correction light on the transparent display. In the correction information generation processing, the display position setting device acquires the calibration information generated by the controller, and extracts a position of the indicator from each of the two pieces of the image data included in the calibration information.

The display position setting device generates correction information in which a position of the indicator extracted from each of the two pieces of the image data is associated with a position of the correction light on the transparent display.

As one aspect of the present example embodiment, the information display system executes aim position setting processing and pointing processing in order to display an aiming light indicating the position of the target on the transparent display. In the aim position setting processing, the display position setting device acquires the two pieces of the image data captured by the pair of cameras, and detects the target from each of the acquired two pieces of the image data. The display position setting device corrects a position of the target detected from each of the two pieces of the image data to a position on the transparent display using the correction information, and sets a position on the transparent display after correction as the display position. In the pointing processing, the controller controls the transparent display in such a way that the aiming light is displayed at the display position set by the display position setting device.

As one aspect of the present example embodiment, the transparent display is achieved by either a transparent organic electroluminescence display (transparent organic EL display) or a transparent micro light emitting diode display (transparent micro LED display). As one aspect of the present example embodiment, the transparent display may be achieved by a transparent inorganic electroluminescence display (transparent inorganic EL display).

Unlike general augmented reality (AR) glasses, the wearable device according to the present example embodiment displays a blurry point light (aiming light) on a transparent display.

When the user wearing the wearable device according to the present example embodiment turns his or her line of sight to the aiming light displayed on the transparent display, the user can recognize a target in an outside view seen through the transparent display. At this time, unlike general AR glasses, the user wearing the wearable device according to the present example embodiment can recognize the target of the outside view without gazing at the aiming light displayed on the transparent display. Thus, when recognizing the target of the outside view, the user wearing the wearable device according to the present example embodiment does not repeatedly focus on the transparent display or focus on the target, and thus is less likely to feel eye fatigue due to movement of the focal position.

With general AR glasses, the user is caused to recognize an image displayed on the lens, and thus the visual field of the user is narrowed. On the other hand, the wearable device according to the present example embodiment does not cause the user to visually recognize the aiming light displayed on the transparent display, but causes the user to turn his or her eyes to the aiming light, and thus the entire transparent display can be set to the visual field.

That is, with the information display system according to the present example embodiment, an image is displayed in the entire visual field, and the user can recognize the target of the outside view without moving the focus of the eyes.

APPLICATION EXAMPLE

Here, some application examples of the information display system 1 according to the present example embodiment will be described. In the following, an example will be described in which the aiming light 125 is displayed on the transparent display unit 120 so that the user wearing the wearable device 10 recognizes the aiming light 125 overlapping with the target 145 present in the outside view seen through the transparent display unit 120. In the following, an example in which the aiming light 125 is displayed on the transparent display unit 120L on the left side will be described, but since the same applies to the transparent display unit 120R on the right side, alphabets (L) at the ends of reference numerals are omitted in the drawings and the description.

Application Example 1

Figure 20:
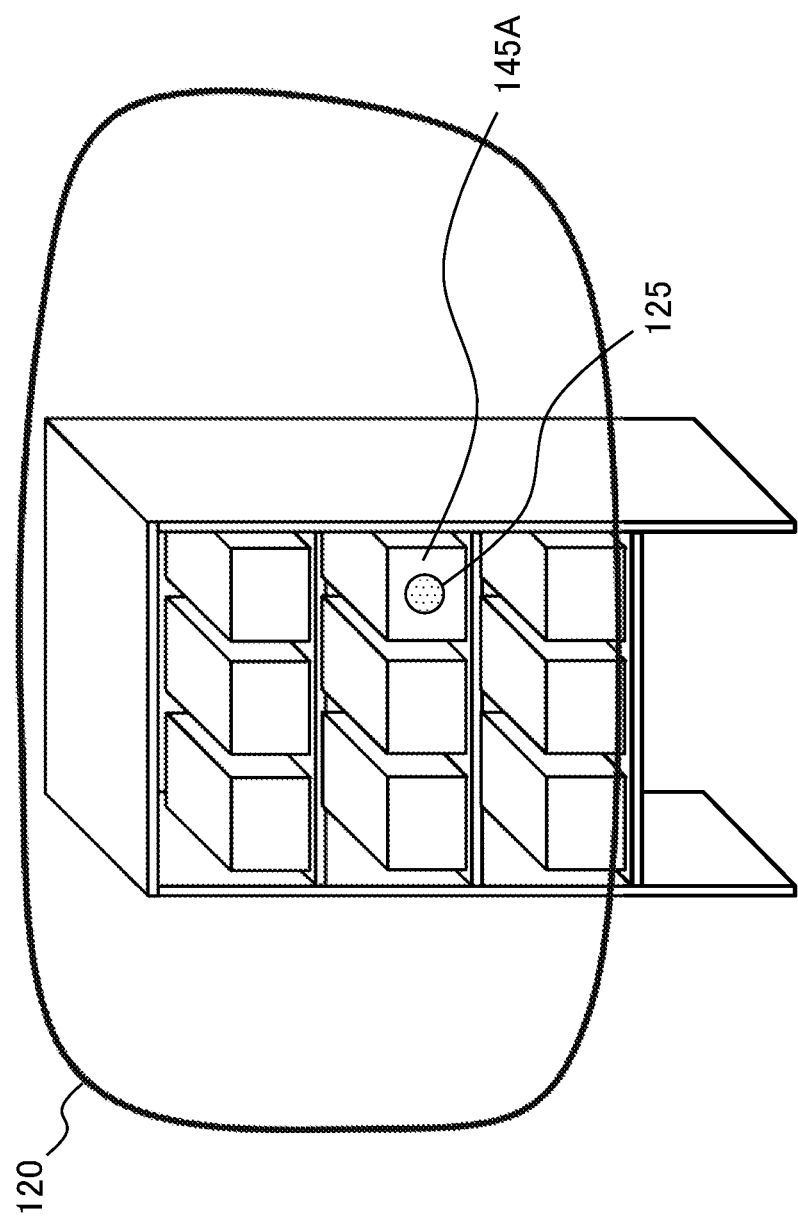
FIG. 20 is a conceptual diagram for describing Application Example 1 of the display system according to the first example embodiment of the present invention.

FIG. 20 is a conceptual diagram for describing Application Example 1 of the present example embodiment. Application Example 1 is an example in which the information display system 1 is used for the purpose of selecting a package as a sorting target from among a plurality of packages arranged on a shelf.

The display position setting device 100 detects a package (target 145A) as a sorting target from a detection image captured by the camera 130 of the wearable device 10. For example, the display position setting device 100 detects the target 145A based on identification information such as a barcode attached to the package. Upon detecting the target 145A in the detection image, the display position setting device 100 extracts the position of the target 145A in the detection image. The display position setting device 100 corrects the extracted position of the target 145A on the detection image to a position on the transparent display unit 120, and transmits display position information including the position after correction to the wearable device 10.

Upon receiving the display position information from the display position setting device 100, the wearable device 10 displays the aiming light 125 at the position on the transparent display unit 120 included in the display position information.

The user wearing the wearable device 10 can recognize, as a sorting target, the package (target 145A) with which the aiming light 125 displayed on the transparent display unit 120 appears to overlap.

Application Example 2

Figure 21:
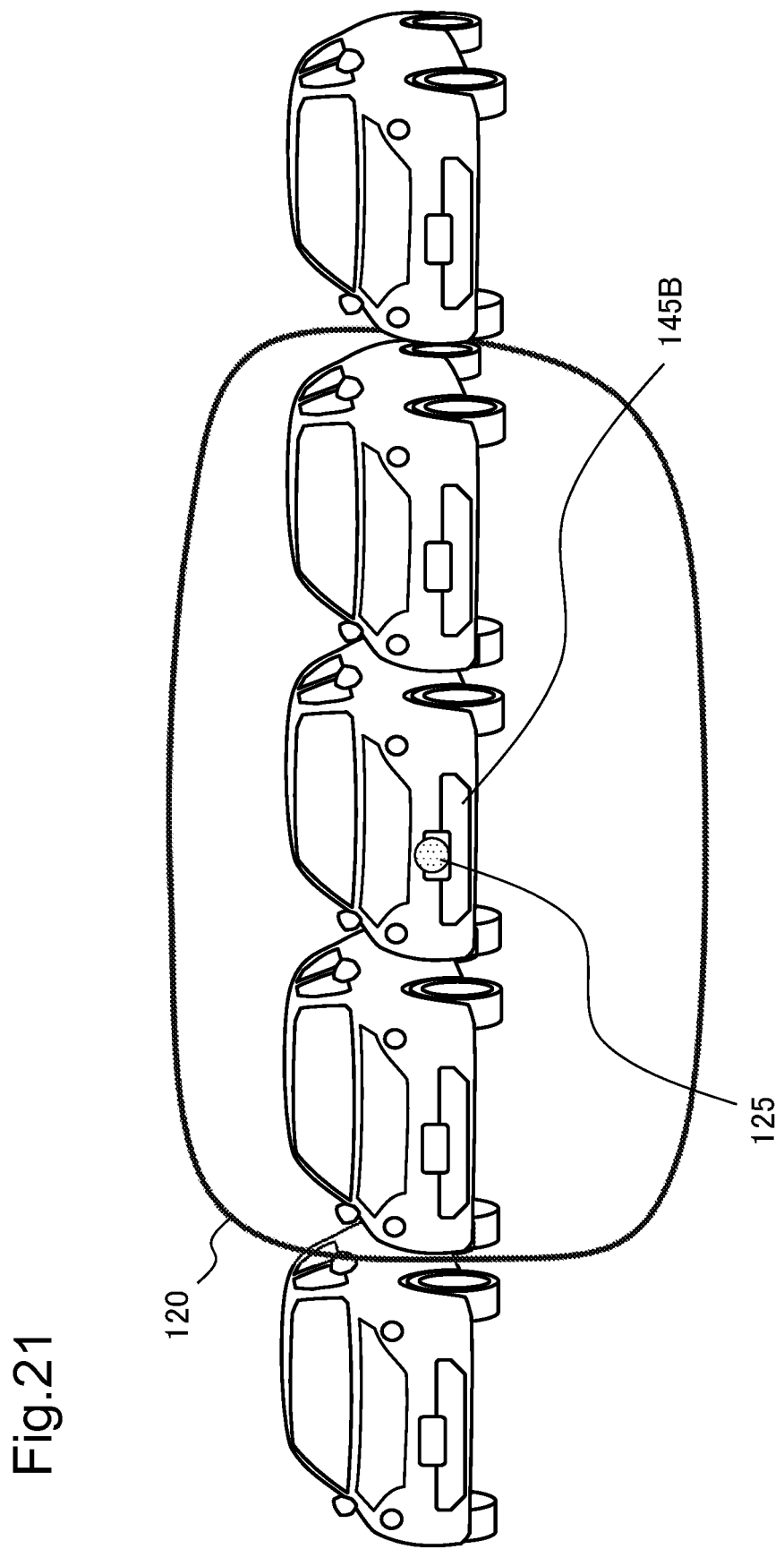
FIG. 21 is a conceptual diagram for describing Application Example 2 of the display system according to the first example embodiment of the present invention.

FIG. 21 is a conceptual diagram for describing Application Example 2 of the present example embodiment. Application Example 2 is an example in which the information display system 1 is used for the purpose of finding one automobile from among a plurality of automobiles parked in a parking lot or on a road. For example, the application example 2 can be used for the purpose of finding a stolen vehicle by a police officer.

The display position setting device 100 detects a license plate (target 145B) of an automobile as a detection target from a detection image captured by the camera 130 of the wearable device 10. For example, the display position setting device 100 detects the target 145B based on a number on the license plate of the automobile. Upon detecting the target 145B in the detection image, the display position setting device 100 extracts the position of the target 145B in the detection image. The display position setting device 100 corrects the extracted position of the target 145B on the detection image to a position on the transparent display unit 120, and transmits display position information including the position after correction to the wearable device 10.

Upon receiving the display position information from the display position setting device 100, the wearable device 10 displays the aiming light 125 at the position on the transparent display unit 120 included in the display position information.

The user wearing the wearable device 10 can recognize the automobile with the license plate (target 145B) with which the aiming light 125 displayed on the transparent display unit 120 appears to overlap as the target to be found.

For example, the application example 2 can be used for the purpose of finding a stolen vehicle by a police officer. When there are two or more stolen vehicles in the field of view of the police officer, it is only required to display the aiming light 125 on all the stolen vehicles. It may be configured to display a light for notifying of the position of a stolen vehicle on the transparent display unit 120 based on information from another system in a case where there is no stolen vehicle in the field of view of the police officer.

Application Example 3

Figure 22:
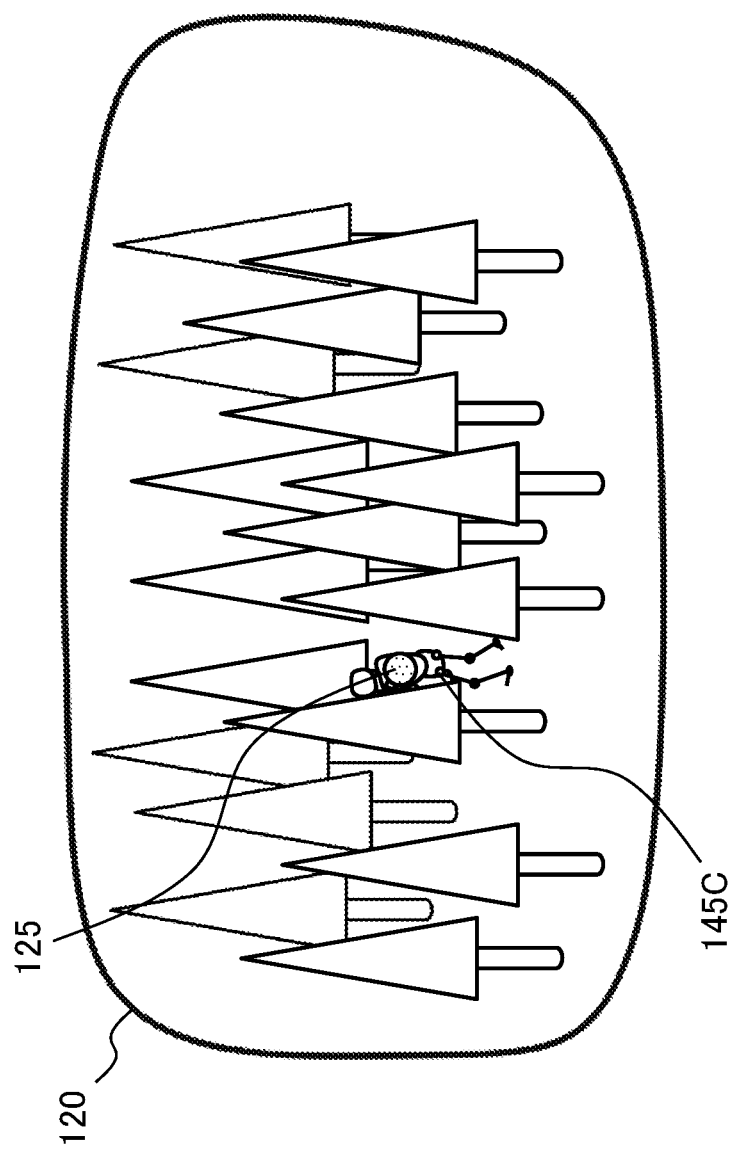
FIG. 22 is a conceptual diagram for describing Application Example 3 of the display system according to the first example embodiment of the present invention.

FIG. 22 is a conceptual diagram for describing Application Example 3 of the present example embodiment. Application Example 3 is an example in which the information display system 1 is used for the purpose of finding a person in a forest.

The display position setting device 100 detects a person (target 145C) from a detection image captured by the camera 130 of the wearable device 10. For example, the display position setting device 100 detects a person (target 145C) in a forest. Upon detecting the target 145C in the detection image, the display position setting device 100 extracts the position of the target 145C in the detection image. The display position setting device 100 corrects the extracted position of the target 145C on the detection image to a position on the transparent display unit 120, and transmits display position information including the position after correction to the wearable device 10.

Upon receiving the display position information from the display position setting device 100, the wearable device 10 displays the aiming light 125 at the position on the transparent display unit 120 included in the display position information.

The user wearing the wearable device 10 can recognize an object (target 145) with which the aiming light 125 displayed on the transparent display unit 120 appears to overlap as the person to be found.

For example, in Application Example 3, the camera 130 may be configured by an infrared camera. When the camera 130 is configured by an infrared camera, a person can be detected even at night.

Application Example 4

Figure 23:
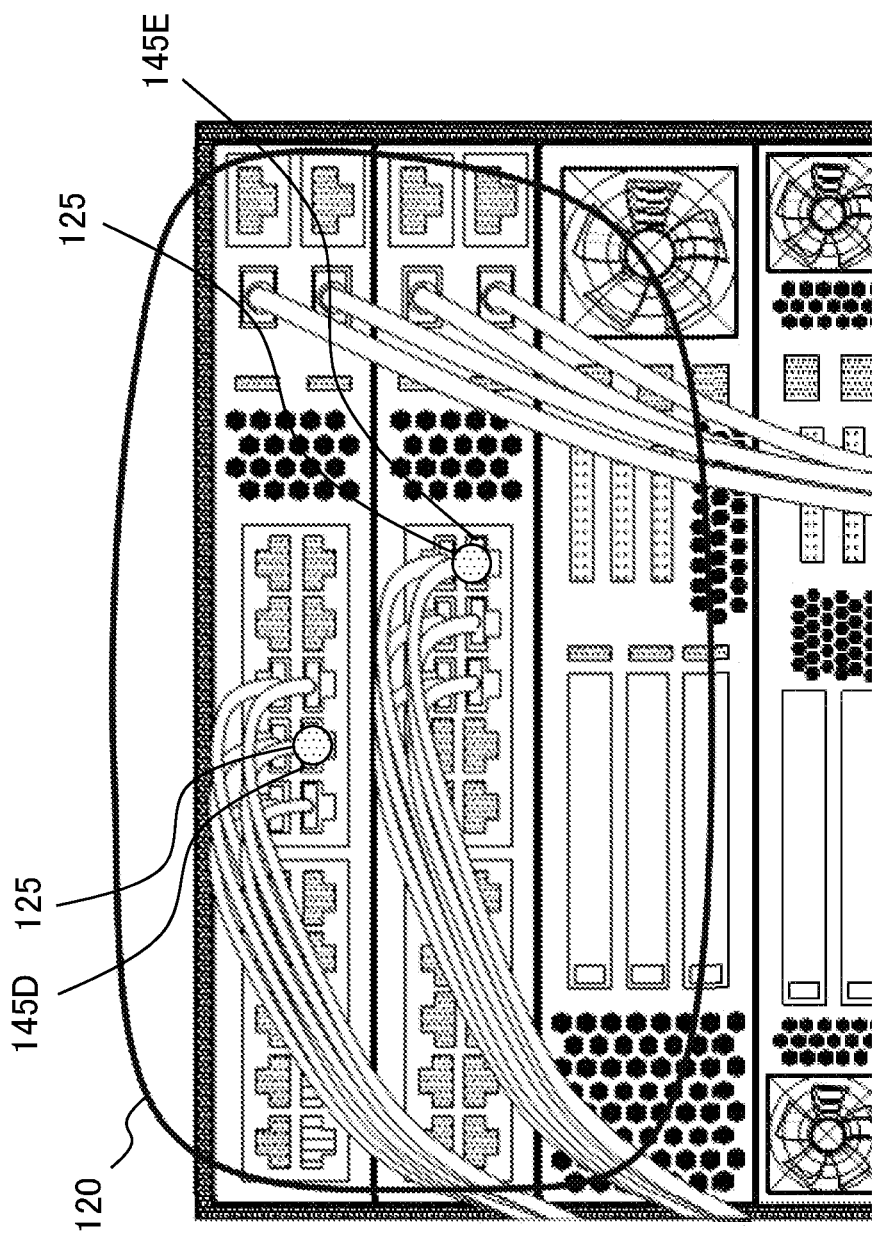
FIG. 23 is a conceptual diagram for describing Application Example 4 of the display system according to the first example embodiment of the present invention.

FIG. 23 is a conceptual diagram for describing Application Example 4 of the present example embodiment. Application Example 4 is an example of application to a remote support system that remotely supports the work of a worker, or application to teaching a procedure of operation to a person by a machine itself. Application Example 4 of FIG. 23 is an example of using the information display system 1 for the purpose of exchanging connection positions of connectors in a rack in which a plurality of servers is arranged.

The display position setting device 100 detects connectors (target 145D, target 145E) for exchanging connection positions from a detection image captured by the camera 130 of the wearable device 10. For example, the display position setting device 100 detects the target 145D and the target 145E based on features registered in advance. Upon detecting the target 145D and the target 145E in a detection image, the display position setting device 100 extracts the positions of the target 145D and the target 145E in the detection image. The display position setting device 100 corrects the extracted positions of the target 145D and the target 145E on the detection image to positions on the transparent display unit 120, and transmits display position information including the positions after correction to the wearable device 10. Upon receiving the display position information from the display position setting device 100, the wearable device 10 displays the two aiming lights 125 at the positions on the transparent display unit 120 included in the display position information.

The user wearing the wearable device 10 can recognize the connectors (target 145D, target 145E) with which the two aiming lights 125 displayed on the transparent display unit 120 appear to overlap as targets of exchanging connection positions.

Application Example 5

Figure 24:
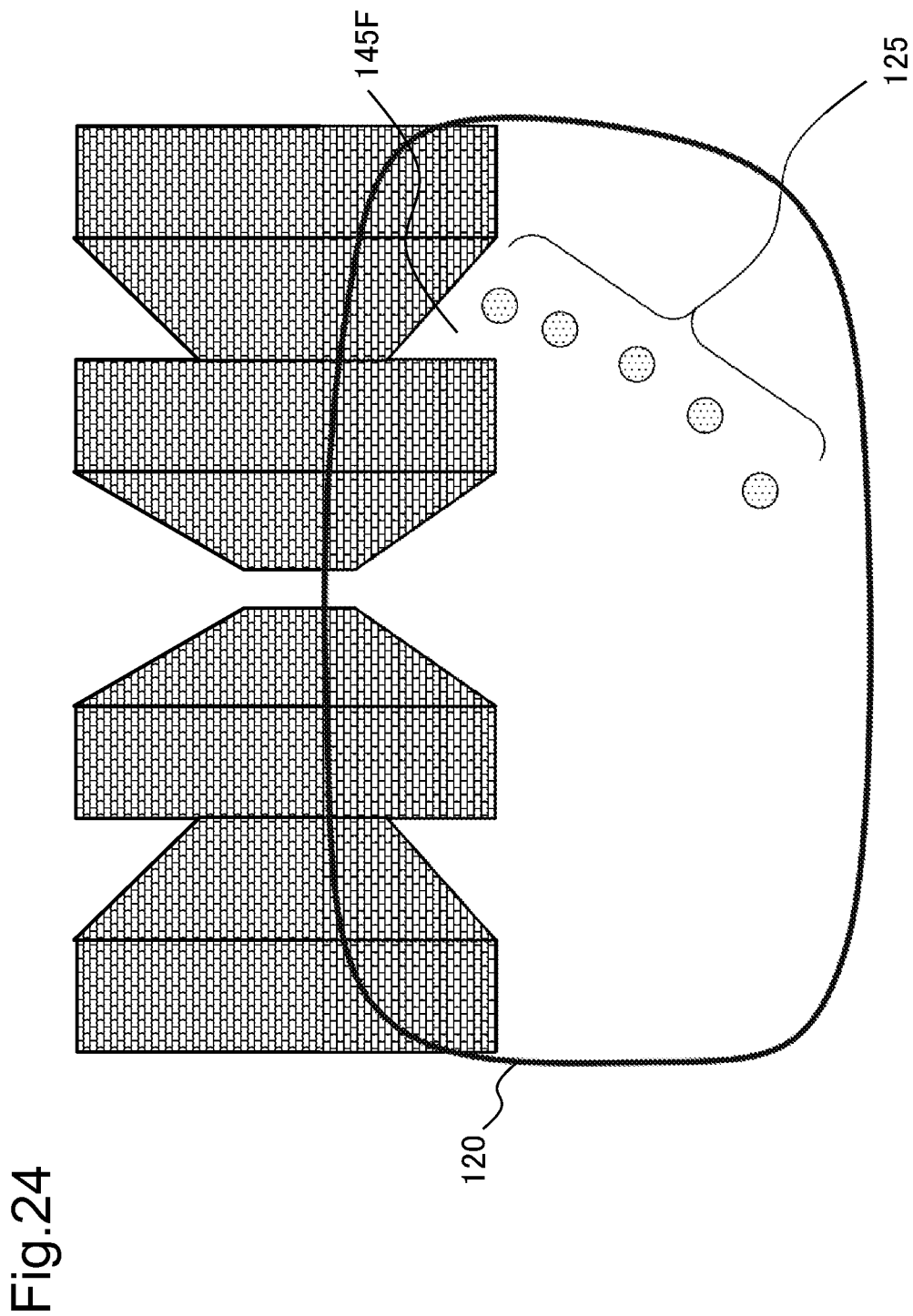
FIG. 24 is a conceptual diagram for describing Application Example 5 of the display system according to the first example embodiment of the present invention.

FIG. 24 is a conceptual diagram for describing Application Example 5 of the present example embodiment. Application Example 5 is an example of using the information display system 1 for the purpose of notifying the user of a path to travel from among a plurality of paths in front of the user.

The display position setting device 100 detects a path (target 145F) along which the user travels from a detection image captured by the camera 130 of the wearable device 10. For example, the display position setting device 100 detects the target 145F based on presence or absence of an object at the end of the path. Upon detecting the target 145F in the detection image, the display position setting device 100 extracts the position of the target 145F in the detection image. The display position setting device 100 corrects the extracted position of the target 145F on the detection image to a position on the transparent display unit 120, and transmits display position information including the position after correction to the wearable device 10.

Upon receiving the display position information from the display position setting device 100, the wearable device 10 displays a plurality of aiming lights 125 for guiding the user to the position on the transparent display unit 120 included in the display position information.

The user wearing the wearable device 10 can recognize the path (target 145F) to travel by the plurality of aiming lights 125 displayed on the transparent display unit 120.

Application Example 6

Figure 25:
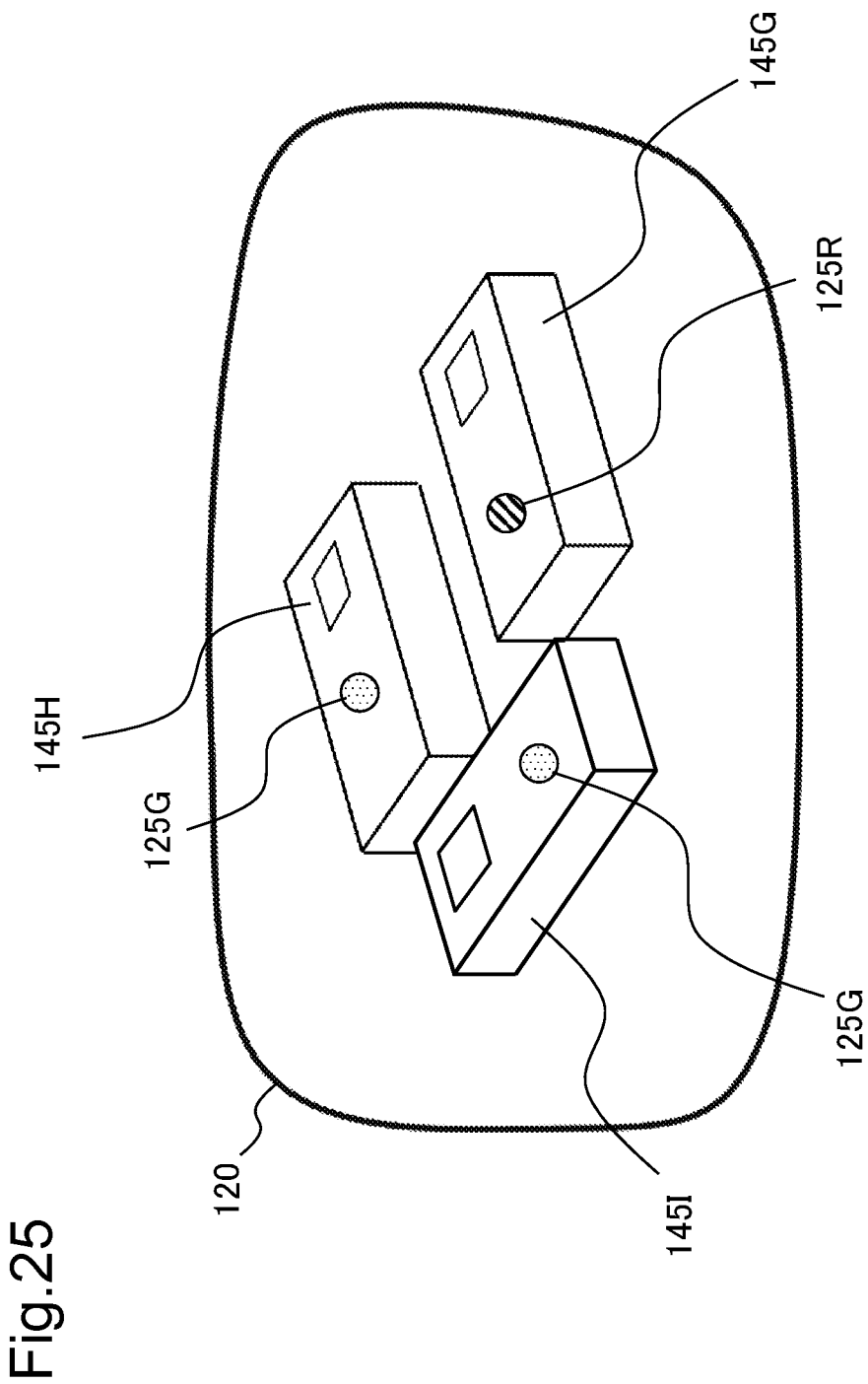
FIG. 25 is a conceptual diagram for describing Application Example 6 of the display system according to the first example embodiment of the present invention.

FIG. 25 is a conceptual diagram for describing Application Example 6 of the present example embodiment. Application Example 6 is an example of applying the information display system 1 for the purpose of sorting delivery items for each of delivery destinations. In Application Example 6, aiming lights (aiming light 125G, aiming light 125R) of colors different for each of the delivery destinations are displayed on the transparent display unit 120.

The display position setting device 100 detects delivery items (target 145G, target 145H, target 145I) to be sorted by the user from a detection image captured by the camera 130 of the wearable device 10. For example, the display position setting device 100 detects the target 145G, the target 145H, and the target 145I based on destinations described on slips attached to the delivery items. In the example of FIG. 25, the delivery destinations of the target 145H and the target 145I are the same, and the delivery destination of the target 145G is different from the delivery destinations of the target 145H and the target 145I.

Upon detecting the target 145G, the target 145H, and the target 145I in the detection image, the display position setting device 100 extracts the positions of the target 145G, the target 145H, and the target 145I in the detection image. The display position setting device 100 corrects the positions of the target 145G, the target 145H, and the target 145I on the extracted detection image to positions on the transparent display unit 120. The display position setting device 100 transmits display position information including the positions of the target 145G, the target 145H, and the target 145I on the transparent display unit 120 to the wearable device 10. At this time, the display position setting device 100 adds, to the display position information, an instruction to display the aiming light 125R at the position of the target 145G and display the aiming light 125G at the positions of the target 145H and the target 145I, in addition to the positions on the transparent display unit 120.

Upon receiving the display position information from the display position setting device 100, the wearable device 10 displays the aiming light 125G and the aiming light 125R at the positions on the transparent display unit 120 included in the display position information.

The user wearing the wearable device 10 can recognize the respective delivery destinations of the delivery items (target 145G, target 145H, target 145I) by the aiming light 125G and the aiming light 125R displayed on the transparent display unit 120.

Application Example 7

Figure 26:
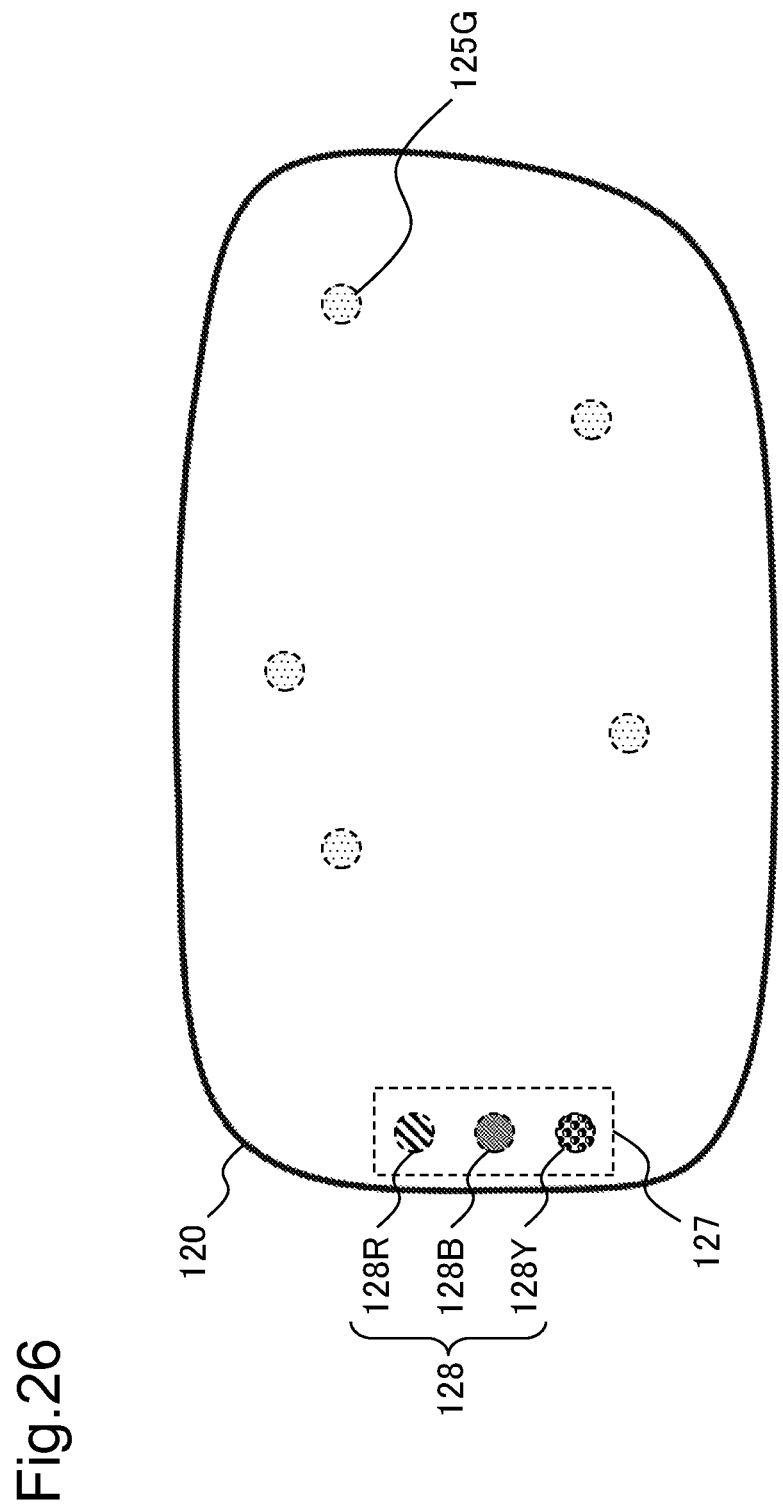
FIG. 26 is a conceptual diagram for describing Application Example 7 of the display system according to the first example embodiment of the present invention.

FIG. 26 is a conceptual diagram for describing Application Example 7 of the present example embodiment. Application Example 7 is an example of setting a notification area 127 in which some information is displayed which the user is to be notified of on the transparent display unit 120. In the notification area 127, notification lights 128 for notifying the user of some information is displayed. The notification area 127 is only required to be set to at least one of the left and right transparent display units 120.

In Application Example 7, the notification area 127 is set at a predetermined position in a peripheral edge portion of the transparent display unit 120. A notification light 128R, a notification light 128B, and a notification light 128Y are displayed in the notification area 127. An aiming light 125G is displayed in a portion other than the notification area 127. For example, the notification light 128R is displayed in red, the notification light 128B is displayed in blue, the notification light 128Y is displayed in yellow, and the aiming light 125G is displayed in green. The colors of the notification lights 128 to be displayed in the notification area 127 are not limited to the ones described here, and can be set to any colors. The notification area 127 may be set at any position on the transparent display unit 120, and the entire transparent display unit 120 may be set as the notification area 127. For example, it may be set to display, when a target is detected, a red or yellow notification light 128 on the entire transparent display unit 120 for a moment. Although FIG. 26 illustrates that the notification light 128R, the notification light 128B, and the notification light 128Y are displayed at different positions, different colors may be switched and displayed at the same position.

The position of the notification area 127 and the positions where the notification light 128R, the notification light 128B, and the notification light 128Y are displayed only required to be stored in the memory 115. The control of displaying the notification light 128R, the notification light 128B, and the notification light 128Y may be configured according to control of the display position setting device 100. For example, when a feature for which the notification light 128 is to be displayed in the detection image is extracted, the display position setting device 100 transmits a display instruction of a specific notification light 128 according to the feature to the wearable device 10. Upon receiving the display instruction of the notification light 128 from the display position setting device 100, the wearable device 10 acquires the position of the notification light 128 according to the display instruction from the memory 115 and displays the notification light 128 in the notification area 127.

For example, when notifying the user that there is danger, the notification light 128R is displayed in the notification area 127. When notifying the user that it is safe, the notification light 128B is displayed in the notification area 127. When calling the user's attention, the notification light 128Y is displayed in the notification area 127. The user wearing the wearable device 10 can sense the notification light 128R, the notification light 128B, and the notification light 128Y displayed in the notification area 127 by colors and recognize his or her situation.

The application examples of the information display system 1 according to the present example embodiment have been described above. Note that the above application examples are examples and do not limit uses to which the information display system 1 according to the present example embodiment are applied.

As in the above application example, as one aspect of the present example embodiment, the display position setting device sets a color of the point light displayed at the display position based on a type of the target detected from the image data captured by the pair of cameras. The controller controls the transparent display in such a way as to display the point light of the color set by the display position setting device at the display position.

As one aspect of the present example embodiment, a notification area in which a notification light is displayed is set on the transparent display. The display position setting device outputs to the controller an instruction to display the notification light in the notification area based on a feature extracted from the image data captured by the pair of cameras. The controller controls the transparent display in such a way as to display the notification light in the notification area in response to an instruction from the display position setting device. The color of the notification light displayed in the notification area can be set to a color different from those of the correction light and the aiming light. The notification lights of a plurality of colors can be displayed in the notification area.

Second Example Embodiment

Next, an information display system according to a second example embodiment of the present invention will be described with reference to the drawings. The information display system according to the present example embodiment is different from that of the first example embodiment in that the transparent display unit is installed only in one rim. Hereinafter, description of configurations and functions similar to those of the first example embodiment will be omitted.

(Configuration)

Figure 27:
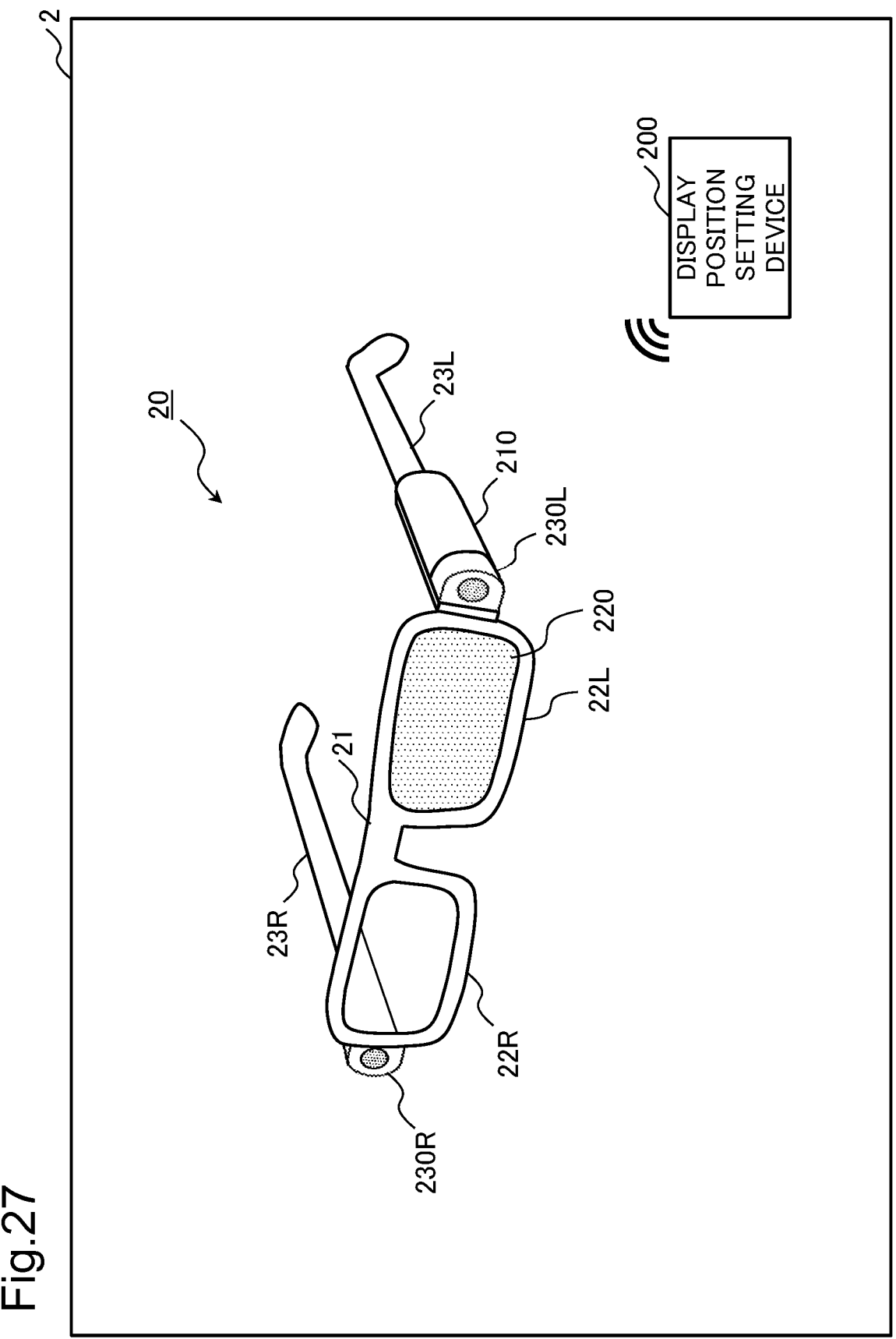
FIG. 27 is a conceptual diagram illustrating an example of a configuration of an information display system according to a second example embodiment of the present invention.

FIG. 27 is a conceptual diagram illustrating a configuration of an information display system 2 according to the present example embodiment. As illustrated in FIG. 27, the information display system 2 includes a wearable device 20 and a display position setting device 200. The display position setting device 200 is similar to the display position setting device 100 according to the first example embodiment, and thus description thereof is omitted.

The wearable device 20 includes a pair of rims 22 (rim 22L, rim 22R) connected by a bridge 21 and a pair of temples 23 (temple 23L, temple 23R) for positioning the rims 22 in front of the left and right eyes of the user. The bridge 21, the rims 22 (rim 22L, rim 22R), and the temples 23 (temple 23L, temple 23R) constitute a frame. When the rims 22 (rim 22L, rim 22R) and the temples 23 (temple 23L, temple 23R) are integrally formed, the rims 22 (rim 22L, rim 22R) and the bridge 21 are integrally formed.

A transparent display unit 220 is fitted into a lens portion of the rim 22L. A camera 230L and a camera 230R are installed on outer surfaces of the temple 23L and the temple 23R, respectively. A device control unit 210 is installed on the outer surface of the temple 23L. FIG. 27 illustrates an example in which the transparent display unit 220 is fitted into the left rim 22L, but the transparent display unit 220 may be configured to be fitted into the right rim 22R. Although FIG. 27 illustrates an example in which nothing is fitted into the right rim 22R, a transparent plastic, glass, lens, or the like may be fitted.

Figure 28:
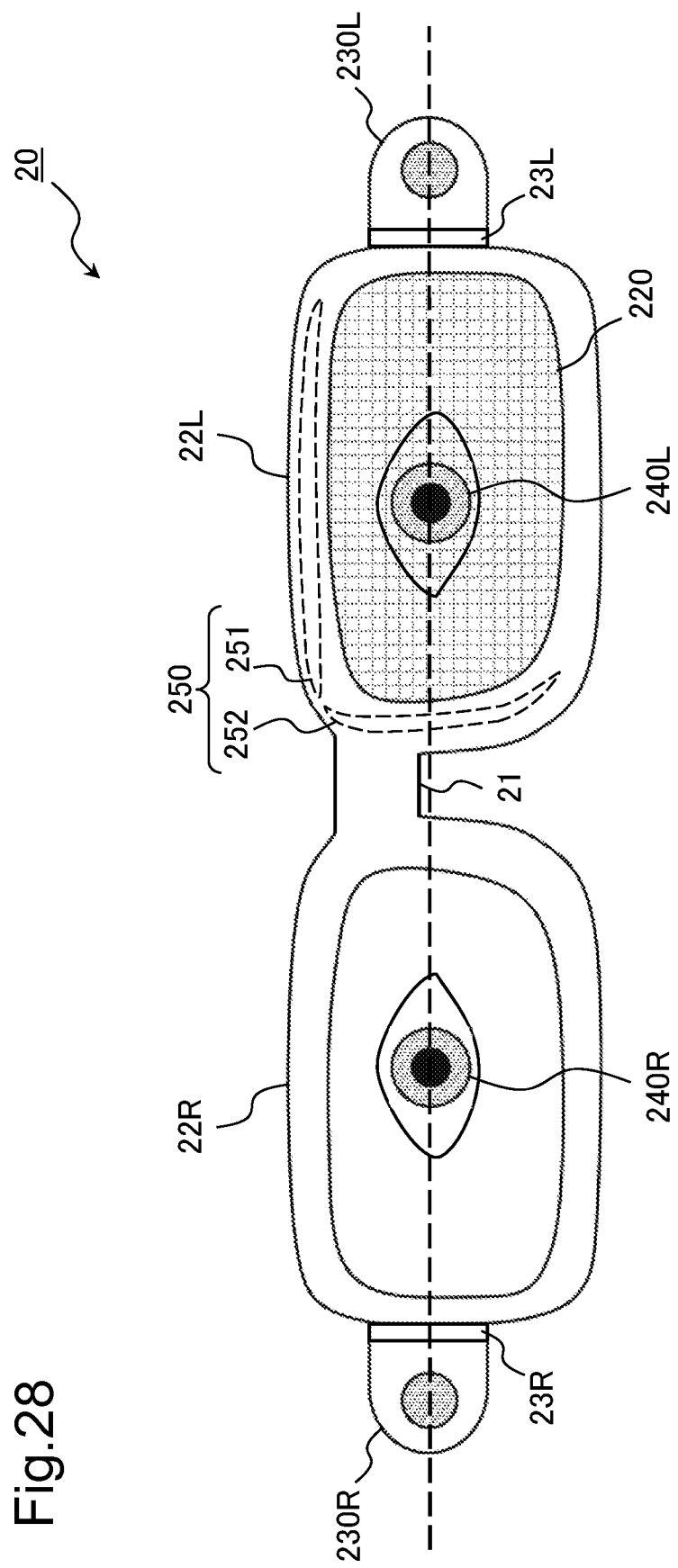
FIG. 28 is a conceptual diagram illustrating an example of an appearance of a wearable device according to the second example embodiment of the present invention.

FIG. 28 is a conceptual diagram for describing a positional relationship between the left eye 240L and the right eye 240R of the user wearing the wearable device 20 and the camera 230L and the camera 230R. As illustrated in FIG. 28, a straight line passing through the lens of the left camera 230L and the lens of the right camera 230R overlaps with a straight line connecting the left eye 240L and the right eye 240R of the user. That is, the camera 230L and the camera 230R, and the left eye 240L and the right eye 240R have the same positions in the vertical direction.

As illustrated in FIG. 28, a driver 250 is mounted on the rim 22L. The driver 250 includes a first driver 251 that drives display in the horizontal direction and a second driver 252 that drives display in the vertical direction. The first driver 251 is arranged above the transparent display unit 220. The second driver 252 is arranged on the left side (the right side in FIG. 28) of the transparent display unit 220.

[Device Control Unit]

Figure 29:
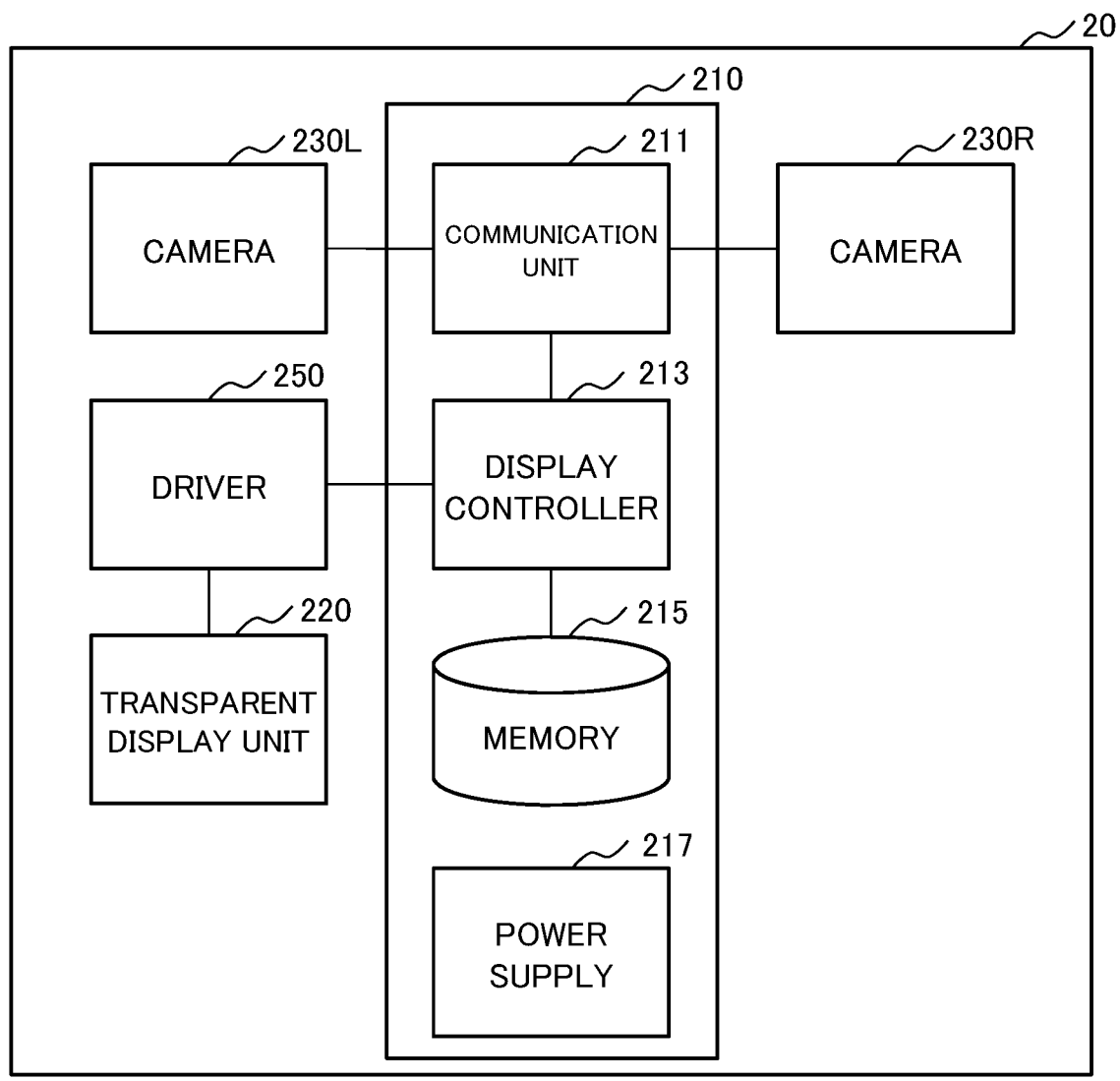
FIG. 29 is a conceptual diagram illustrating an example of a configuration of the wearable device according to the second example embodiment of the present invention.

Next, the device control unit 210 that controls the wearable device 20 will be described with reference to the drawings. FIG. 29 is a block diagram for describing a configuration of the device control unit 210 of the wearable device 20.

As illustrated in FIG. 29, the device control unit 210 includes a communication unit 211, a display controller 213, a memory 215, and a power supply 217.

The communication unit 211 is connected to the camera 230L and the camera 230R. The communication unit 211 is connected to the display position setting device 200 so that data can be transmitted and received wirelessly or by wire. The communication unit 211 acquires image data of capturing at the same timing from each of the camera 230L and the camera 230R. The communication unit 211 transmits the image data acquired from each of the camera 230L and the camera 230R to the display position setting device 200.

At the time of calibration, the communication unit 211 acquires image data (correction image) in which an indicator matched with a correction light displayed on the transparent display unit 220 is captured. At this time, the communication unit 211 acquires the position of the correction light displayed on the transparent display unit 220 at the time of capturing the correction image from the display controller 213. The communication unit 211 transmits, to the display position setting device 200, calibration information in which correction images acquired from the camera 230L and the camera 230R are associated with the position of the correction light displayed on the transparent display unit 220 at the time of capturing the correction images. The communication unit 211 may transmit the calibration information to the display position setting device 200 every time the correction image is acquired, or may collectively transmit correction information regarding a plurality of correction images generated by one time of calibration to the display position setting device 200.

The communication unit 211 is connected to the display controller 213. The communication unit 211 receives, from the display position setting device 200, display position information including the display position of an aiming light to be overlapped and displayed on a target. The communication unit 211 outputs the display position of the aiming light included in the received display position information to the display controller 213.

The display controller 213 is connected to the communication unit 211, the memory 215, and the driver 250. At the time of calibration, the display controller 213 acquires information regarding a correction light to be displayed on the transparent display unit 220 from the memory 215. The display controller 213 controls the driver 250 so that the correction light is displayed on the transparent display unit 220 at a predetermined timing. At the time of target detection, the display controller 213 acquires information regarding the aiming light to be displayed on the transparent display unit 220 from the memory 215. The display controller 213 displays the aiming light at a display position acquired from the communication unit 211.

The memory 215 is connected to the display controller 213. The memory 215 stores information regarding the correction light and the aiming light to be displayed on the transparent display unit 220. For example, the memory 215 stores information regarding colors of the correction light, the aiming light, and the like to be displayed on the transparent display unit 220. Images other than the correction light and the aim for aiming light may be stored in the memory 215.

The power supply 217 is a secondary battery for driving the wearable device 20. For example, the power supply 217 is a secondary battery that can be charged by wireless power feeding. The power supply 217 may be a secondary battery that can supply power in a wired manner by a power cable.

The configuration of the information display system 2 according to the present example embodiment has been described above. Note that the configurations of FIGS. 27 to 29 are examples, and the configuration of the information display system 2 according to the present example embodiment is not limited to the mode as it is. Operation of the information display system 2 according to the present example embodiment is similar to operation of the information display system 1 of the first example embodiment, and thus description thereof is omitted.

The wearable device 20 according to the present example embodiment is not limited to the glasses-type as long as it has a configuration in which two cameras (the camera 230L and the camera 230R) and one transparent display unit 220 are combined. For example, the wearable device 20 according to the present example embodiment may have a structure such as goggles or a helmet.

Figure 30:
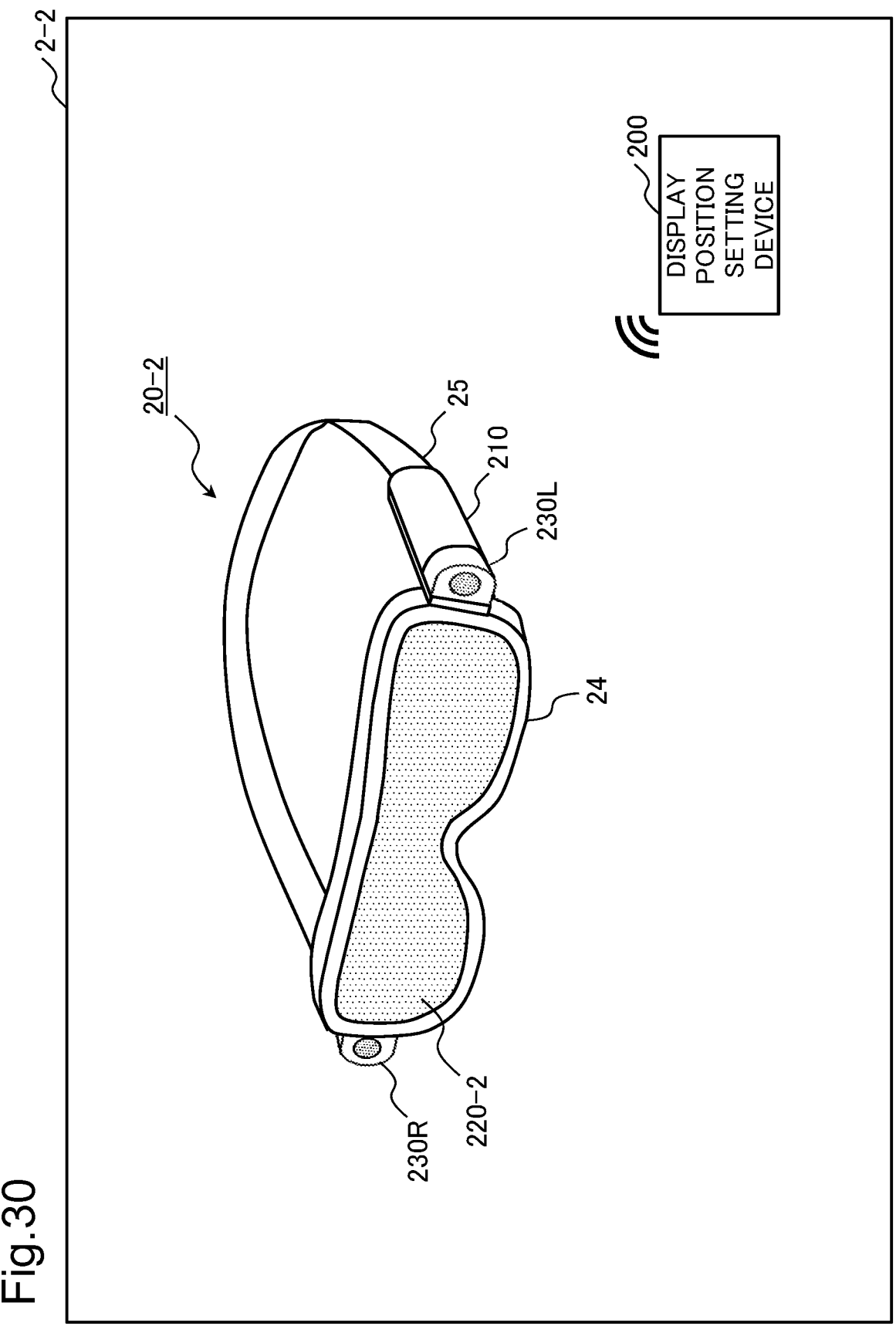
FIG. 30 is a conceptual diagram illustrating a modification example of the configuration of the information display system according to the second example embodiment of the present invention.

FIG. 30 is a conceptual diagram for describing a modification example (information display system 2-2) of the configuration of the information display system 2. The information display system 2-2 is different from the information display system 2 in that it includes a goggle-type wearable device 20-2. A display position setting device 200 of the information display system 2-2 can be configured similarly to that of the information display system 2.

As illustrated in FIG. 30, the wearable device 20-2 includes a frame 24 and a band 25 for fixing the frame 24 in front of the eyes of the user. A transparent display unit 220-2 is fitted into a lens portion of the frame 24. The transparent display unit 220-2 has a different shape, but can be configured similarly to the transparent display unit 220 of the information display system 2. A camera 230L and a camera 230R are installed at both side ends of the frame 24. The camera 230L and the camera 230R are arranged such that a straight line passing through the lens of the camera 230L and the lens of the camera 230R overlaps with a straight line connecting the left eye and the right eye of the user. The camera 230L and the camera 230R of the information display system 2-2 can be configured similarly to those of the information display system 2. A device control unit 210 is installed behind the camera 230L. The device control unit 210 of the information display system 2-2 can be configured similarly to that of the information display system 2.

Similarly to the information display system 2 in FIG. 27, the information display system 2-2 in FIG. 30 uses the image data captured by the two cameras (the camera 230L and the camera 230R) to display the aiming light overlapping with the target in the outside view on the transparent display unit 220. The user wearing the wearable device 20-2 can recognize the target by turning his or her line of sight toward the aiming light displayed on the transparent display unit 220.

As described above, the information display system according to the present example embodiment includes a wearable device and a display position setting device. The display position setting device detects a target based on a feature extracted from image data captured by the pair of cameras, and sets, as a display position, a position at which a straight line connecting an eye of the user wearing the frame and the target passes through the transparent display. The wearable device includes a frame, a pair of cameras arranged at both side ends of the frame, a transparent display fitted into the frame, and a controller that controls the transparent display in such a way as to display a point light at the display position set by the display position setting device.

As one aspect of the present example embodiment, the frame has a first rim arranged in front of one eye of a user and into which the transparent display is fitted, and a second rim arranged in front of another eye of the user. The display position setting device sets a position at which a straight line connecting the one eye and the target passes through the transparent display as a display position based on the two pieces of the image data captured by the pair of cameras.

With the information display system according to the present example embodiment, an image is displayed in the entire visual field, and the user can recognize a target of an outside view without moving the focus of the eyes.

Third Example Embodiment

Next, an information display system according to a third example embodiment of the present invention will be described with reference to the drawings. The information display system according to the present example embodiment is a simplified version of the information display systems of the first and second example embodiments. Hereinafter, the description of similar configurations and functions to those of the first and second example embodiments will be omitted.

Figure 31:
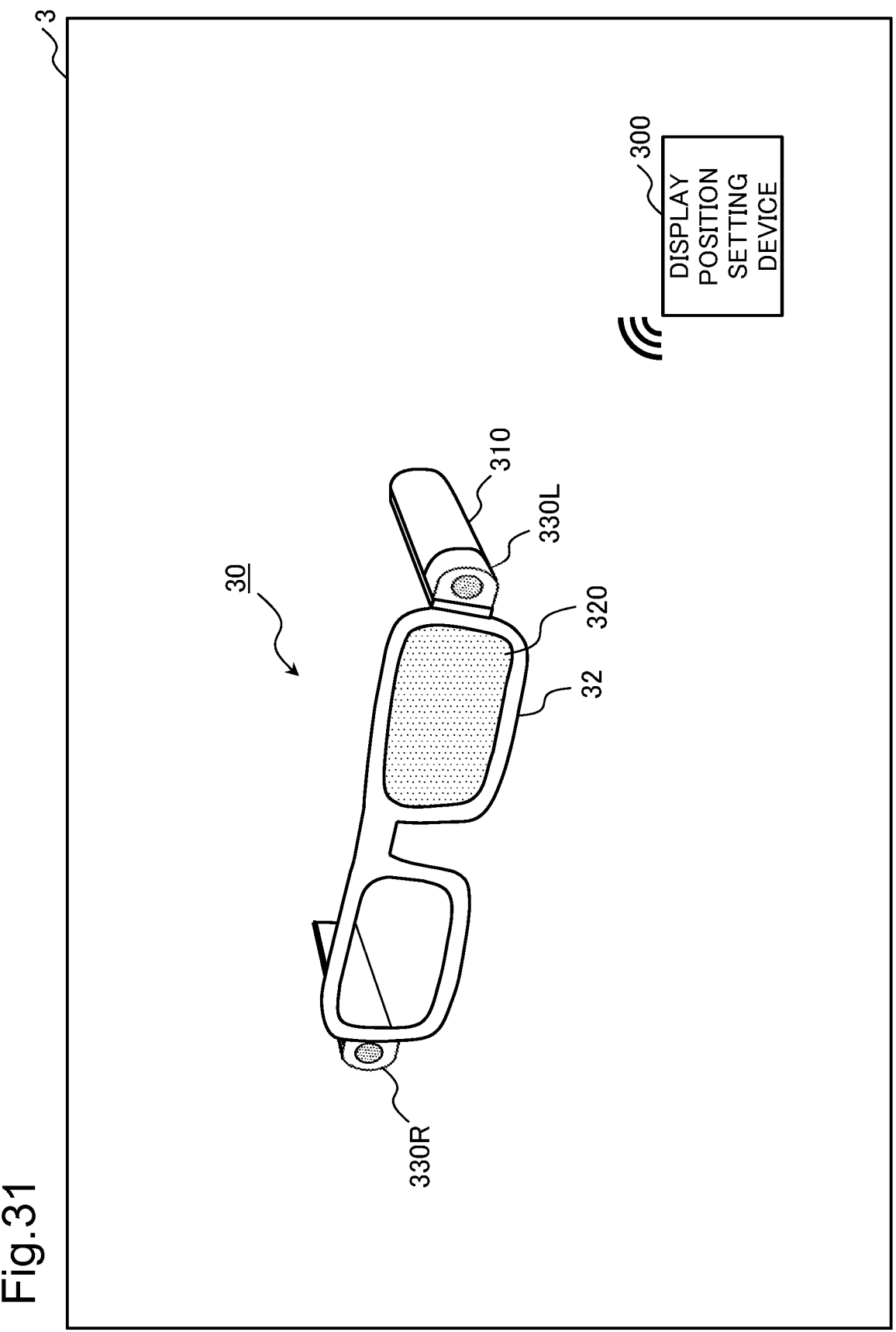
FIG. 31 is a conceptual diagram illustrating an example of a configuration of an information display system according to a third example embodiment of the present invention.

FIG. 31 is a conceptual diagram illustrating an outline of a configuration of an information display system 3 according to the present example embodiment. As illustrated in FIG. 31, the information display system 3 includes a wearable device 30 and a display position setting device 300. Although FIG. 31 illustrates an example in which the wearable device 30 and the display position setting device 300 are arranged at distant positions, the function (display position setting unit) of the display position setting device 300 may be configured to be incorporated in the wearable device 30.

The wearable device 30 includes a frame 32, a camera 330L, a camera 330R, a transparent display 320, and a controller 310. The frame 32 is, for example, a part in which rims and a bridge are integrated. In practice, parts for fixing the transparent display 320 in front of an eye of the user are provided on the frame 32. The pair of cameras 330L and 330R is arranged at both side ends of the frame 32. The transparent display 320 is fitted into the frame 32. For example, a driver, which is not illustrated, is embedded in a portion of the frame 32 around the transparent display 320. Although FIG. 31 illustrates an example in which the transparent display 320 is arranged in the left lens portion, the transparent display 320 may be arranged in the right lens portion, or the transparent display 320 may be arranged in the lens portions on both sides.

The controller 310 has a configuration corresponding to the device control unit 110 according to the first example embodiment or the device control unit 210 according to the second example embodiment. The controller 310 controls the transparent display 320 to display a point light at a display position set by the display position setting device 300. For example, the controller 310 drives a driver, which is not illustrated, to control the transparent display 320. FIG. 31 illustrates an example in which the controller 310 is arranged behind the camera 330L, but the position at which the controller 310 is arranged is not particularly limited. For example, the controller 310 is connected to the camera 330R at an opposite position via wiring, which is not illustrated, arranged inside the frame 32.

The display position setting device 300 detects a target based on features extracted from image data captured by the pair of cameras 330L and 330R. The display position setting device 300 sets, as a display position, a position at which a straight line connecting the eyes of the user wearing the frame 32 and the target passes through the transparent display 320.

The wearable device of the information display system according to the present example embodiment does not cause the user to visually recognize the point light displayed on the transparent display, but causes the user to turn his or her eyes to the point light, so that the entire transparent display can be set in the field of view. When the user wearing the wearable device of the information display system according to the present example embodiment directs his or her line of sight toward the point light displayed on the transparent display, the user can recognize a target in the outside view seen through the transparent display. Therefore, when recognizing the target of the outside view, the user wearing the wearable device according to the present example embodiment can recognize the target of the outside view visible through the transparent display without repeatedly focusing on the transparent display or focusing on the target.

That is, with the information display system according to the present example embodiment, an image is displayed in the entire visual field, and the user can recognize the target of the outside view without moving the focus of the eyes.

(Hardware)

Here, a hardware configuration for achieving the display position setting device according to each example embodiment of the present invention will be described using an information processing device 90 in FIG. 32 as an example. Note that the information processing device 90 in FIG. 32 is a configuration example for achieving the display position setting device of each example embodiment, and does not limit the scope of the present invention.

Figure 32:
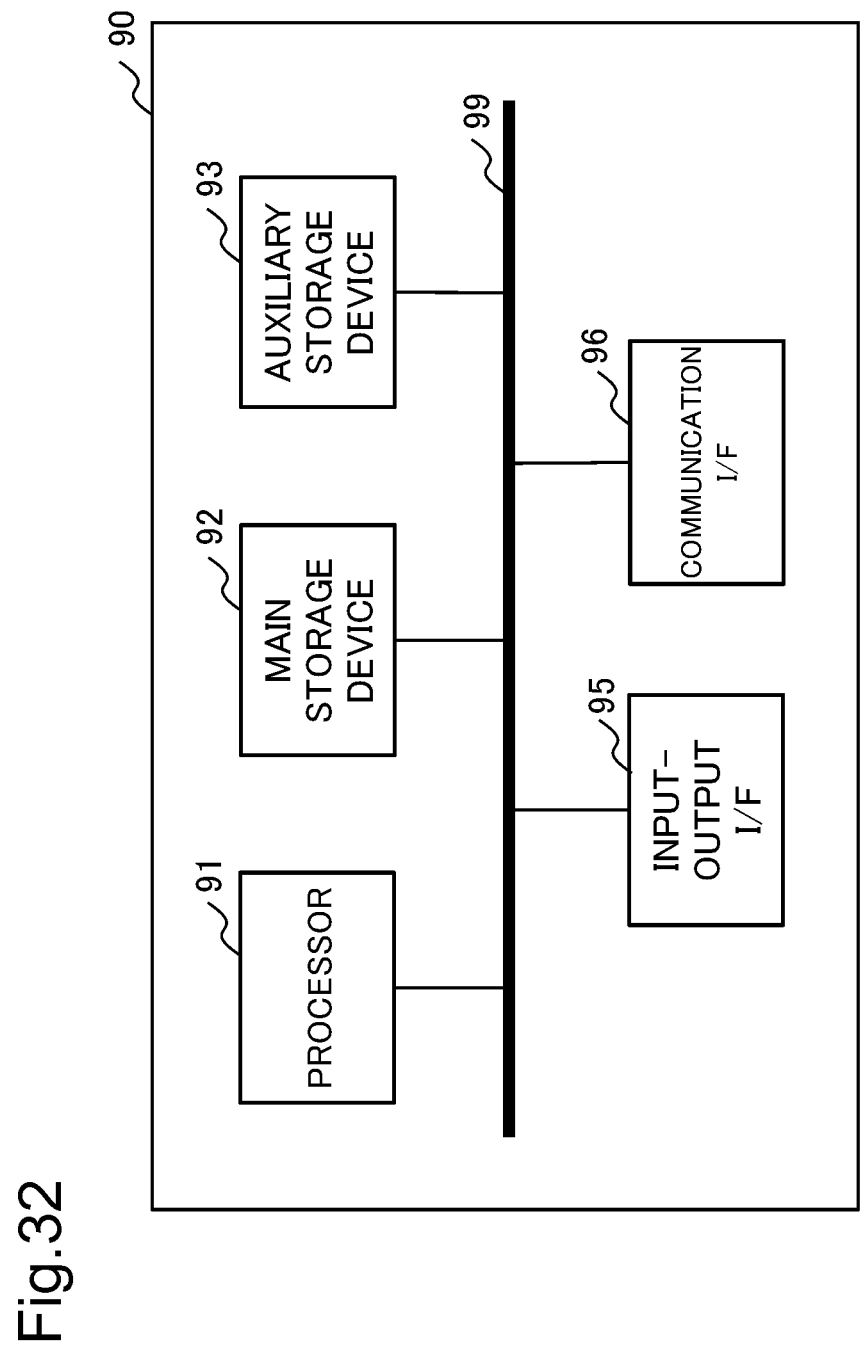
FIG. 32 is a block diagram illustrating an example of a hardware configuration for achieving the display position setting device according to each example embodiment of the present invention.

As illustrated in FIG. 32, the information processing device 90 includes a processor 91, a main storage device 92, an auxiliary storage device 93, an input-output interface 95, and a communication interface 96. In FIG. 32, the interface is abbreviated as I/F. The processor 91, the main storage device 92, the auxiliary storage device 93, the input-output interface 95, and the communication interface 96 are data-communicably connected to each other via a bus 99. The processor 91, the main storage device 92, the auxiliary storage device 93, and the input-output interface 95 are connected to a network such as the Internet or an intranet via the communication interface 96.

The processor 91 develops a program stored in the auxiliary storage device 93 or the like in the main storage device 92 and executes the developed program. In the present example embodiment, it is only required to use a software program installed in the information processing device 90. The processor 91 executes processing by the display position setting device according to the present example embodiment.

The main storage device 92 has an area in which a program is developed. The main storage device 92 is only required to be, for example, a volatile memory such as a dynamic random access memory (DRAM). A nonvolatile memory such as a magnetoresistive random access memory (MRAM) may be configured and added as the main storage device 92.

The auxiliary storage device 93 stores various data. The auxiliary storage device 93 includes a local disk such as a hard disk or a flash memory. The main storage device 92 may be configured to store various data, and the auxiliary storage device 93 may be omitted.

The input-output interface 95 is an interface for connecting the information processing device 90 and a peripheral device. The communication interface 96 is an interface for wireless or wired connection to a wearable device based on a standard and/or specifications. The communication interface 96 may be set as an interface for connection to the Internet or an intranet.

An input device such as a keyboard, a mouse, or a touch panel may be connected to the information processing device 90 as necessary. These input devices are used to input information and settings. When the touch panel is used as the input device, the display screen of the display device is only required to also serve as the interface of the input device. Data communication between the processor 91 and the input device is only required to be mediated by the input-output interface 95.

The information processing device 90 may be provided with a display device for displaying information. In a case where a display device is provided, the information processing device 90 preferably includes a display control device (not illustrated) for controlling display of the display device. The display device is only required to be connected to the information processing device 90 via the input-output interface 95.

The information processing device 90 may be provided with a disk drive as necessary. The disk drive is connected to the bus 99. The disk drive mediates reading of data and/or program from a recording medium, writing of a processing result of the information processing device 90 to the recording medium, and the like between the processor 91 and the recording medium (program recording medium), which is not illustrated. The recording medium can be achieved by, for example, an optical recording medium such as a compact disc (CD) or a digital versatile disc (DVD). The recording medium may be achieved by a semiconductor recording medium such as a universal serial bus (USB) memory or a secure digital (SD) card, a magnetic recording medium such as a flexible disk, or another recording medium.

The above is an example of a hardware configuration for enabling the display position setting device according to each example embodiment of the present invention. Note that the hardware configuration of FIG. 32 is an example of a hardware configuration for achieving the display position setting device according to each example embodiment, and does not limit the scope of the present invention. A program for causing a computer to execute processing related to the display position setting device according to each example embodiment is also included in the scope of the present invention. Further, a program recording medium in which the program according to each example embodiment is recorded is also included in the scope of the present invention.

The components of the display position setting device of each example embodiment can be freely combined. The components of the display position setting device of each example embodiment may be achieved by software or may be achieved by a circuit.

While the present invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-049401, filed on Mar. 18, 2019, the disclosure of which is incorporated herein in its entirety by reference.

[Reference Signs List]
 1, 2, 3 information display system
 10, 20, 30 wearable device
 11, 21 bridge
 12L, 12R, 22L, 22R rim
 13L, 13R, 23L, 23R temple
 16 cable
 32 frame
 100, 200, 300 display position setting device
 101 transmission-reception unit
 102 image processing unit
 103 correction information generation unit
 104 correction information storage unit
 105 target detection unit
 106 target information storage unit
 107 display position setting unit
 110, 210 device control unit 111, 211 communication unit
113, 213 display controller
115, 215 memory
117, 217 power supply
120L, 120R, 220 transparent display unit
130L, 130R, 230L, 230R, 330L, 330R camera
131L, 132L left image
131R, 132R right image
150, 250 driver
151L, 151R, 251 first driver
152L, 152R, 252 second driver
310 controller
320 transparent display

What is claimed is:

1. An information display system comprising:
a frame;
a pair of cameras arranged at both side ends of the frame;
a transparent display fitted into the frame;
at least one memory storing instructions; and
at least one processor connected to the at least one memory and configured to execute the instructions to:
detect a target based on a feature extracted from image data captured by the pair of cameras;
set, as a display position, a position at which a straight line connecting an eye of a user wearing the frame and the target passes through the transparent display based on calibration information generated by calibration with a physical indicator; and
control the transparent display in such a way as to display a point light at the display position that has been set.

2. The information display system according to claim 1, wherein
the at least one processor is configured to execute the instructions to further:
cause the transparent display to display the point light to be used for the calibration;
cause the pair of cameras to capture an image of the physical indicator located on a straight line connecting an eye of the user looking at the point light displayed on the transparent display and the point light;
acquire two pieces of the image data captured by the pair of cameras;
generate the calibration information in which the acquired two pieces of the image data are associated with a position of the point light on the transparent display;
extract a position of the physical indicator from each of the two pieces of the image data included in the calibration information;
generate correction information in which the position of the physical indicator extracted from each of the two pieces of the image data is associated with the position of the point light on the transparent display; and
store the generated correction information.

3. The information display system according to claim 2, wherein
the at least one processor is configured to execute the instructions to further:
acquire the two pieces of the image data captured by the pair of cameras;
detect the target from each of the acquired two pieces of the image data;
correct a position of the target detected from each of the two pieces of the image data to a position on the transparent display using the correction information;
set the position on the transparent display after correction as the display position; and
control the transparent display in such a way that the point light is displayed at the display position.

4. The information display system according to claim 2, wherein
the frame includes:
a first rim arranged in front of one eye of a user and into which the transparent display is fitted; and
a second rim arranged in front of another eye of the user, and
the at least one processor is configured to execute the instruction to further:
set a position at which a straight line connecting the one eye and the target passes through the transparent display as the display position based on the two pieces of the image data captured by the pair of cameras.

5. The information display system according to claim 2, wherein
the transparent display includes:
a first transparent display and a second transparent display,
the frame includes:
a first rim arranged in front of one eye of a user and into which the first transparent display is fitted; and
a second rim arranged in front of another eye of the user and into which the second transparent display is fitted, and
the at least one processor is configured to execute the instructions to further:
set a position at which a straight line connecting the one eye and the target passes through the first transparent display as a first display position;
set a position at which a straight line connecting the another eye and the target passes through the second transparent display as a second display position based on the two pieces of the image data captured by the pair of cameras,
control the first transparent display in such a way as to display the point light at the first display position; and
control the second transparent display in such a way as to display the point light at the second display position.

6. The information display system according to claim 1, wherein
the at least one processor is configured to execute the instruction to further:
set a color of the point light displayed at the display position based on a type of the target detected from the image data captured by the pair of cameras; and
control the transparent display in such a way as to display the point light of the color set that has been set at the display position.

7. The information display system according to claim 1, wherein
on the transparent display,
a notification area in which a notification light is displayed is set, and
the at least one processor is configured to execute the instructions to further:
control the transparent display in such a way as to display the notification light in the notification area based on a feature extracted from the image data captured by the pair of cameras.

8. The information display system according to claim 1, wherein the transparent display is either a transparent organic electroluminescence display or a transparent micro light emitting diode display.

9. A wearable device comprising:
a frame;
a pair of cameras arranged at both side ends of the frame;
a transparent display fitted into the frame;
at least one memory storing instructions; and
at least one processor connected to the at least one memory and configured to execute the instructions to:
detect a detection target based on a feature extracted from image data captured by the pair of cameras,
control the transparent display in such a way as to display a point light, based on calibration information generated by calibration with a physical indicator, at a position at which a straight line connecting an eye of a user wearing the frame and the detection target passes through the transparent display based on image data captured by the pair of cameras.

* * * * *